(12) United States Patent
Uyama

(10) Patent No.: US 8,150,614 B2
(45) Date of Patent: Apr. 3, 2012

(54) ROUTING GUIDE MEDIATION SYSTEM, ROUTING GUIDE MEDIATION SERVER, AND ROUTING GUIDE METHOD

(75) Inventor: Hiroshi Uyama, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 0 days.

(21) Appl. No.: 13/127,861

(22) PCT Filed: Nov. 7, 2008

(86) PCT No.: PCT/JP2008/070311
§ 371 (c)(1),
(2), (4) Date: May 5, 2011

(87) PCT Pub. No.: WO2010/052790
PCT Pub. Date: May 14, 2010

(65) Prior Publication Data
US 2011/0219027 A1 Sep. 8, 2011

(51) Int. Cl.
*G01C 21/00* (2006.01)
(52) U.S. Cl. ........ 701/201; 701/206; 701/208; 701/214; 340/995.23
(58) Field of Classification Search .................. 701/201, 701/206, 208, 209, 212, 214; 340/995.19, 340/995.23; 707/E17.014, E17.018
See application file for complete search history.

(56) References Cited

U.S. PATENT DOCUMENTS
6,029,069 A 2/2000 Takaki
7,342,516 B2 * 3/2008 Kato et al. ............... 340/995.19

FOREIGN PATENT DOCUMENTS

| AU | 732540 B2 | 12/1997 |
|---|---|---|
| EP | 0 810 571 A1 | 12/1997 |
| JP | 9-292250 A | 11/1997 |
| JP | 09-319991 A | 12/1997 |
| JP | 2001-165681 A | 6/2001 |
| JP | 2002-243477 A | 8/2002 |
| JP | 2003-097960 A | 4/2003 |
| JP | 2007-218770 A | 8/2007 |
| JP | 2008-210244 A | 9/2008 |

OTHER PUBLICATIONS

International Search Report of PCT/JP2008/070311, date of mailing Dec. 9, 2008.
Notification of Transmittal of Translation of the International Preliminary Report on Patentability (Form PCT/IB/338) of International Application No. PCT/JP2008/070311 mailed Jun. 30, 2011 with Forms PCT/IB/373, PCT/IB/237, and PCT/IB/326.

* cited by examiner

*Primary Examiner* — Gertrude Arthur Jeanglaude
(74) *Attorney, Agent, or Firm* — Westerman, Hattori, Daniels & Adrian, LLP; William F. Westerman

(57) ABSTRACT

A routing guide mediation system is equipped with a routing guide mediation server, establishing cooperation between a plurality of routing guide systems having map data by country and region and network data for route search. When a departure point and a destination are points in different areas, a first route search server extracts a candidate contact point which will be the boundary between the different areas, and transmits it to a second route search server via the routing guide mediation server. Then, the first and second route search servers search for an optical route from the departure point to the candidate contact point and an optimal candidate route from the candidate contact point to the destination, individually, and the first route search server acquires the amounts of time required for these routes and link data via the routing guide mediation server.

9 Claims, 11 Drawing Sheets

ROUTING GUIDE MEDIATION SYSTEM, ROUTING GUIDE MEDIATION SERVER, AND ROUTING GUIDE METHOD

TECHNICAL FIELD

The present invention relates to a routing guide system for searching and providing guidance for a candidate route from an arbitrary departure point to a destination by walking, automotive transport, or public transportation, and particularly relates to a routing guide mediation system, a routing guide mediation server, and a routing guide method in which cooperation is established between a plurality of routing guide systems having map data for each country and region, and network data for route searching when a route that straddles countries or regions is searched and guidance is provided using roads and transportation; and in which a series of routing guide services from a departure point to a destination that straddles countries or regions are smoothly handed off from system to system.

BACKGROUND ART

There are conventionally known navigation devices and navigation systems for searching a route from a desired departure point to a destination and providing guidance to a user using map data and road data, and examples of such navigation devices and navigation systems that have been implemented include car navigation devices that are mounted in an automobile and that provide route guidance to a driver, and communication-type navigation systems that send route search requests to a route search server and receive the results to receive route guidance using a mobile phone as a terminal device for navigation.

In particular, a communication-type navigation system is also used as a navigation system for pedestrians. There are also navigation systems for pedestrians that preferably have a route guidance function that includes modes of transportation and have, in addition to searching and providing guidance for walking routes, a function for collecting operation timetable data and routes for railroads, airplanes, buses, and other modes of transportation, and for providing guidance for routes (boarding-candidate train) from a desired departure station to a desired destination station in addition to searching and providing guidance of walking route. There are also transportation guide systems for receiving and displaying routes for modes of transportation, timetables, boardable trains, and other distributed information from an information distribution server that does not provide route searches for walking routes.

Route search devices and route search methods used in general navigation devices and communication navigation systems are disclosed in, e.g., Patent Document 1 (Japanese Laid-open Patent Application No. 2001-165681). This navigation system is configured so as to send departure point and destination information from a mobile navigation terminal to an information distribution server, search from road network and transportation network data in the information distribution server, and provide guidance for a route that matches the search conditions. Used as one search condition for a route search is movement means from a departure point to a destination, examples of which include walking, automobile, railroad, aircraft, and other modes of transportation in combination with walking.

The information distribution server uses the positions of connecting points and curve points of roads (routes) in a map data as connection points as nodes, and the route that connects the nodes as links, and is provided with cost information (distance, time required) of all the links as a database. The information distribution server references the database, and is capable of sequentially searches for links that reach from the node of the departure point to the node of the destination, following nodes and links that minimize the cost information of links, and providing guidance to the mobile navigation terminal about the shortest route. A method referred to as the label determination method or the Dijkstra method is used as the route search technique. A route search method that uses the Dijkstra method is disclosed in Patent Document 1 noted below.

Route search systems for searching routes using transportation systems are provided with an operation timetable database in which operation timetable data of transportation systems have been organized into a database on the basis of departure time, departure point, destination, arrival time, and other route search conditions specified by the user; and are provided with data in which the transportation network has been organized into a database on the basis of the above. The route search systems are configured to reference these databases, connect a departure point and a destination that includes transit changes (transfers), sequentially follow usable modes of transportation (individual trains and shuttle buses) as a route, and present one or a plurality of candidates for route guidance (departure station, destination station, course, train, and other modes of transportation) that matches the route search conditions. Route search conditions that can be specified commonly further include required time, number of transit changes, fares, and other conditions.

Map data and route search network data provided to a common routing guide system is data related to a region (referred to herein as service area) to which the system provides routing guide service. For example, an ordinary routing guide system is designed for domestic service in a certain country, or is designed for service in a specific region in a certain country.

In such a case, there is no problem in a route search or route guidance as long as the departure point and destination are within the service area of a certain routing guide system. However, the total route cannot be search or guidance provided from a departure point to a destination in the case that the departure point is within a certain country and the destination is located in another country. The reason for this is that the route that the routing guide system on the departure point side can search and provide guidance for has a range that lies within the country of the departure point side, and is not provided with map data and route search network data of the other country of the destination side.

In an onboard navigation device or the like, map data and route search network data of a specific region are stored in the onboard navigation device; and when a geographical point outside of the area is set as the destination, the route search depends on a server provided with map data and route search network data of the entire country that includes the other region. Alternatively, a method may be used in which a route search is enabled on the navigation device side by downloading the map data and route search network data of the lacking regions.

For example, such a routing guide device has been disclosed in Patent Document 2 noted below (Japanese Laid-open Patent Application 2003-97960). The routing guide device uses starting points midway in the route as a plurality of candidates when route search from the departure point to the destination is carried out in a central facility. When the starting points are transmitted to the routing guide device, the routing guide device determines and transmits to the central facility the starting points for which guidance can be provided. The central facility carries out a route search from the departure point to the starting points, and the guide device is designed to carry out a route search from the starting points to the destination and provide an optimal route from the departure point to the destination.

[Patent Reference 1]: Japanese Laid-open Patent Application No. 2001-165681 (FIGS. 1 and 2)
[Patent Reference 2]: Japanese Laid-open Patent Application No. 2003-97960 (FIGS. 1 and 2)

DISCLOSURE OF THE INVENTION

Problems the Invention is Intended to Solve

A described above, there are cases in which a routing guide service cannot be provided merely by using map data and route search network data that a certain routing guide system has in order to provide service. It is possible to provide the service needs of a user when the portion for which a route cannot be searched with one routing guide system can be searched in coordination which another routing guide system using the route search function of the other routing guide system, and the two routing guide systems can join together the guidance routes thus searched, such as in the routing guide system disclosed in Patent Document 2.

However, depending on the country, there are cases in which it is prohibited to provide map data, road network and transportation network data to another country. Such restrictions are mainly in place for reasons related to national defense. The routing guide device disclosed in Patent Document 2 is a system based on the assumption that the map data contained in the routing guide device is map data of part of an area, and that the server contains map data of an entire country which includes the map data of the part of an area that the navigation device contains.

In the routing guide system, route search network data is created from the map data and the information of the road network and transportation network data and is kept in a database; and the map database containing map information must be retained in order to provide route guidance to a user. In the case that a routing guide system attempts to provide service across national boundaries, the map data, road network and transportation network data of the other country for which service is being attempted is required in addition to that of the home country. Therefore, in such a case, there is a problem in that the method of the routing guide device disclosed in Patent Document 2 cannot be used.

The applicant of the present invention has already submitted an International Patent Application for the invention described in PCT/JP2008/058182 for the purpose of providing a routing guide system in which routing guide systems provided with map data and route search network data for each country or region are coordinated and a series of routing guide services from a departure point to a destination in another country or region is smoothly handed off from system to system.

The invention described in the International Patent Application of PCT/JP2008/058182 provides coordination between a first and second routing guide system provided with map data and route search network data of each country and region, and is configured as shown in FIG. 11. In FIG. 11, the system A is a routing guide system in which area A is the service area, the system B is a routing guide system in which area B is the service area, and the routing guide systems of the system A and system B are systems having the same configuration.

The route search server 30A has only map data and route search network data that cover area A, and the route search server 30B has only map data and route search network data that cover area B. Therefore, the route search server 30A cannot carry out route searches that have a geographical point in area B as a departure point or destination, and the route search server 30B cannot carry out route searches that have a geographical point in area A as a departure point or destination.

In the case that the departure point and the destination in a route search request from the terminal device 20 are geographical points in different areas, the first routing guide system (A) extracts and sends to the second routing guide system (B) the candidate contact points within the boundary of a different area. The first and second routing guide systems search for an optimal candidate route from the departure point to a candidate contact point and an optimal candidate route from the candidate contact point to the destination, respectively, and provide required time and link data to the respective routing guide systems. The first or second routing guide system determines a recommended route having the shortest total required time among the candidate routes connected together at the candidate contact point, provides the recommended route data including the link data from the first routing guide system (A) to the terminal device, and requests route guidance to the first or second routing guide system on the basis of the recommended route data in accordance with area in which the terminal device is positioned.

In accordance with such a system configuration, it is possible to provide seamless route guidance from a departure point of the service area to a destination other than the service area by holding only contact point information between the service area and the area to which a destination area outside the service area belongs, sharing only the contact point information, and using the route guidance information of both areas in the case that route guidance is carried out to a location other than the service area for which map data or the like is unavailable. Therefore, it is possible to coordinate between routing guide systems provided with the map data and route search network data of respective countries or regions, and to smoothly hand off a series of routing guide systems from a departure point to a destination that straddle countries or regions from system to system.

However, there are numerous routing guide systems that have a specific country or region as a service area. In such a case, there is a problem in that the routing guide server A which has received a route search request must specify a routing guide system from among numerous routing guide systems that has the area containing a geographical point G as a service area in the case that the terminal device has transmitted to the routing guide server of the routing guide system A a route search request in which the departure point is a geographical point S within the area that a certain guide system A provides service and the destination is a geographical point G within the area that another routing guide system B provides service.

In order to solve the problems described above, the route search servers of numerous routing guide systems must each have as data the information about the existence of other routing guide systems capable of coordination and information about the other routing guide systems, e.g., information about the areas to which other routing guide systems provide service, and information about the URL or the like of the server that provides the service. There is a new problem in that the data of all existing routing guide systems must be added and updated each time a new routing guide system is added to the systems being coordinated. There is a further problem in that in the case that the destination in a route search is in a different area outside of the service area, an area judgment function is required for specifying a routing guide system having the area to which the destination belongs as a service area, and the server of each routing guide system must have such a function.

The present inventors, as a result of thoroughgoing research to solve the problems described above, perfected the present invention having found that the problems described above can be solved by providing a routing guide mediation server that is connected to individual routing guide systems to be coordinated and that relays route search requests and candidate route information obtained in accordance with the route search requests between the route search servers of the routing guide systems; and by bringing together the URL of the server that provides the service, the contact point information at the boundaries with all other areas, and other data in the routing guide mediation server.

In other words, in order to overcome these problems, an object of the present invention is to provide a routing guide mediation system and a routing guide mediation server that coordinates between a plurality of routing guide systems provided with map data and route search network data for each country or region, and smoothly hands off from system to system a series of routing guide services from a departure point to a destination that straddles countries or regions, particularly when a route that straddles countries or regions is to be searched and guidance provided using roads and modes of transportation.

Means for Solving the Abovementioned Problems

In order to solve the problems described above, the present invention according to a first aspect is a routing guide mediation system provided with a routing guide mediation server connected to a plurality of routing guide systems comprising a route search server, for which a predetermined area is used as a service area, the route search server having a map database populated with map data of the area, and route search network data including road network data and transportation network data of the area; and a terminal device connected to the route search server, wherein the routing guide mediation server has: area determination means for determining, from geographical point information of a destination contained in a route search request transmitted from a first route search server, areas belonging to the geographical point; routing guide system determination means for specifying a route search system that provides route guidance service to determined areas; a contact point network database for storing connection information of a plurality of candidate contact points in movement means for linking the areas; and candidate contact point and candidate route data editing means for calculating candidate route information from a first area to a candidate contact point of a second area on the basis of route information in the areas searched by the first route search server; the area determination means determines a second area to which the destination belongs from the destination information transmitted from the first route search server; the routing guide system determination means determines a second route search server for providing routing guide service to the second area determined by the area determination means; the candidate contact point and candidate route data editing means calculates routing information and contact point information transmitted from the first route search server, and routing information up to a candidate contact point of the second area on the basis of the connection information of the candidate contact point of the second area; and the routing guide mediation server transmits to the second route search server a route search request that includes the destination information and routing information calculated by the candidate contact point and candidate route data editing means, and transmits to the first route search server the link data of the candidate route which includes the data of a recommended route from the candidate contact point of the second area to the destination, as provided by the second route search server.

A first mode of the first aspect of the present invention is the routing guide mediation system according to the first aspect, characterized in that in a case that the routing guide mediation server is provided with POI information-providing means and the destination information related to the destination transmitted from the first route search server includes an area name and a destination information request, the POI information-providing means acquires the POI information from the second route search server determined by the routing guide system determination means on the basis of the area determined by the area determination means, and transmits the acquired POI information to the first route search server.

A second mode of the first aspect of the present invention is the routing guide mediation system according to the first aspect, characterized in that in a case that the destination information transmitted from the first route search server is only a destination information request, the POI information-providing means acquires POI category information from each of another plurality of route search servers connected via a network, and transmits the POI category information thus acquired to the first route search server.

The present invention according to a second aspect is a routing guide mediation server connected to a plurality of routing guide systems comprising a route search server, for which a predetermined area is used as a service area, the route search server having a map database populated with map data of the area, and route search network data including road network data and transportation network data of the area; and a terminal device connected to the route search server, the routing guide mediation server is characterized in having: area determination means for determining, from geographical point information of a destination contained in a route search request transmitted from a first route search server, areas belonging to the geographical point; routing guide system determination means for specifying a route search system that provides route guidance service to determined areas; a contact point network database for storing connection information of a plurality of candidate contact points in movement means for linking the areas; and candidate contact point and candidate route data editing means for calculating candidate route information from a first area to a candidate contact point of a second area on the basis of route information in the areas searched by the first route search server, wherein the area determination means determines a second area to which the destination belongs from the destination information transmitted from the first route search server; the routing guide system determination means determines a second route search server for providing routing guide service to the second area determined by the area determination means; the candidate contact point and candidate route data editing means calculates routing information and contact point information transmitted from the first route search server, and routing information up to a candidate contact point of the second area on the basis of the connection information of the candidate contact point of the second area; and the routing guide mediation server transmits to the second route search server a route search request that includes the destination information and routing information calculated by the candidate contact point and candidate route data editing means, and transmits to the first route search server the link data of the candidate route which includes the data of a recommended route from the candidate contact point of the second area to the destination, as provided by the second route search server.

A first mode of the second aspect of the present invention is the routing guide mediation server according to the second aspect, characterized in that in a case that the routing guide mediation server is provided with POI information-providing means and the destination information related to the destination transmitted from the first route search server includes an area name and a destination information request, the POI information-providing means acquires the POI information from the second route search server determined by the routing guide system determination means on the basis of the area determined by the area determination means, and transmits the acquired POI information to the first route search server.

A second mode of the second aspect of the present invention is the routing guide mediation server according to the second aspect, characterized in that in a case that the destination information transmitted from the first route search server is only a destination information request, the POI information-providing means acquires POI category information from each of another plurality of route search servers connected via a network, and transmits the POI category information thus acquired to the first route search server.

The present invention according to a third aspect is a routing guide method that uses a routing guide mediation server connected to a plurality of routing guide systems comprising: a route search server, for which a predetermined area is used as a service area, the route search server having a map database populated with map data of the area, and route search network data including road network data and transportation network data of the area; and a terminal device connected to the route search server, the routing guide method characterized in comprising: the routing guide mediation server having: area determination means for determining, from geographical point information of a destination contained in a route search request transmitted from a first route search server, areas belonging to the geographical point; routing guide system determination means for specifying a route search system that provides route guidance service to determined areas; a contact point network database for storing connection information of a plurality of candidate contact points in movement means for linking the areas; and candidate contact point and candidate route data editing means for calculating candidate route information from a first area to a candidate contact point of a second area on the basis of route information in the areas searched by the first route search server; and further comprising: a step in which the area determination means determines a second area to which the destination belongs from the destination information transmitted from the first route search server; a step in which the routing guide system determination means determines a second route search server for providing routing guide service to the second area determined by the area determination means; a step in which the candidate contact point and candidate route data editing means calculates routing information and contact point information transmitted from the first route search server, and routing information up to a candidate contact point of the second area on the basis of the connection information of the candidate contact point of the second area; a step in which the routing guide mediation server transmits to the second route search server a route search request that includes the destination information and routing information calculated by the candidate contact point and candidate route data editing means; and a step in which the routing guide mediation server transmits to the first route search server the link data of the candidate route which includes the data of a recommended route from the candidate contact point of the second area to the destination, as provided by the second route search server.

A first mode of the third aspect of the present invention is the routing guide method according to the third aspect, characterized in comprising, in a case that the routing guide mediation server is provided with POI information-providing means and the destination information related to the destination transmitted from the first route search server includes an area name and a destination information request, a step in which the POI information-providing means acquires the POI information from the second route search server determined by the routing guide system determination means on the basis of the area determined by the area determination means, and transmits the acquired POI information to the first route search server.

A second mode of the third aspect of the present invention is the routing guide method according to the third aspect, characterized in comprising, in a case that the destination information transmitted from the first route search server is only a destination information request, a step in which the POI information-providing means acquires POI category information from each of another plurality of route search servers connected via a network, and transmits the POI category information thus acquired to the first route search server.

Effect of the Invention

According to the first aspect of the present invention, the area determination means determines a second area to which the destination belongs from the destination information transmitted from the first route search server; the routing guide system determination means determines a second route search server for providing routing guide service to the second area determined by the area determination means; the candidate contact point and candidate route data editing means calculates routing information and contact point information transmitted from the first route search server, and routing information from a candidate contact point of the second area on the basis of the connection information of the candidate contact point of the second area; and the routing guide mediation server transmits to the second route search server a route search request that includes the destination information and routing information calculated by the candidate contact point and candidate route data editing means, and transmits to the first route search server the link data of the candidate route which includes the data of a recommended route from the candidate contact point of the second area to the destination, as provided by the second route search server.

Therefore, geographical point information of a plurality of candidate contact points in movement means that links countries and regions is exchanged when a route that straddles countries or regions is searched and guidance provided using roads and modes of transportation. The respective routing guide systems (route search servers) search for departure points or destinations and candidate routes to each candidate contact point, exchange information, integrate candidate contact points, use the integrated route as the recommended route having the lowest cost from the departure point to the destination, and provide the recommended route to the terminal device, thereby making it possible to readily coordinate a plurality of routing guide systems and to provide seamless route guidance from a departure point of a service area to a destination outside the service area.

According to the first mode of the first aspect of the present invention, the routing guide mediation service is provided with POI information-providing means, and in the case that the destination information related to a destination transmitted from a first routing guide server includes an area name and destination information request, the POI information-providing means acquires and transmits to the first routing guide server the POI information from a second routing guide server determined by the routing guide system determination means on the basis of the area determined by the area determination means. Therefore, when a destination is to be set, the user of a terminal device can acquire POI information within another area and set the destination using the POI information thus acquired.

In the second mode of the first aspect of the present invention, the POI information-providing means acquires POI category information from the other plurality of route search servers connected via a network and transmits the acquired POI category information to the first route search server in the case that the destination information transmitted from the first route search server is only a destination information request. Therefore, when a destination is to be set, the user of the terminal device can acquire POI category information within another area and acquire POI information using the acquired POI category information.

According to the second aspect of the present invention, a routing guide mediation server constituting the first aspect of the present invention can be provided; and in the third aspect of the present invention, a route search method for implementing the routing guide mediation server of the second aspect of the present invention can be provided.

Figure 1:
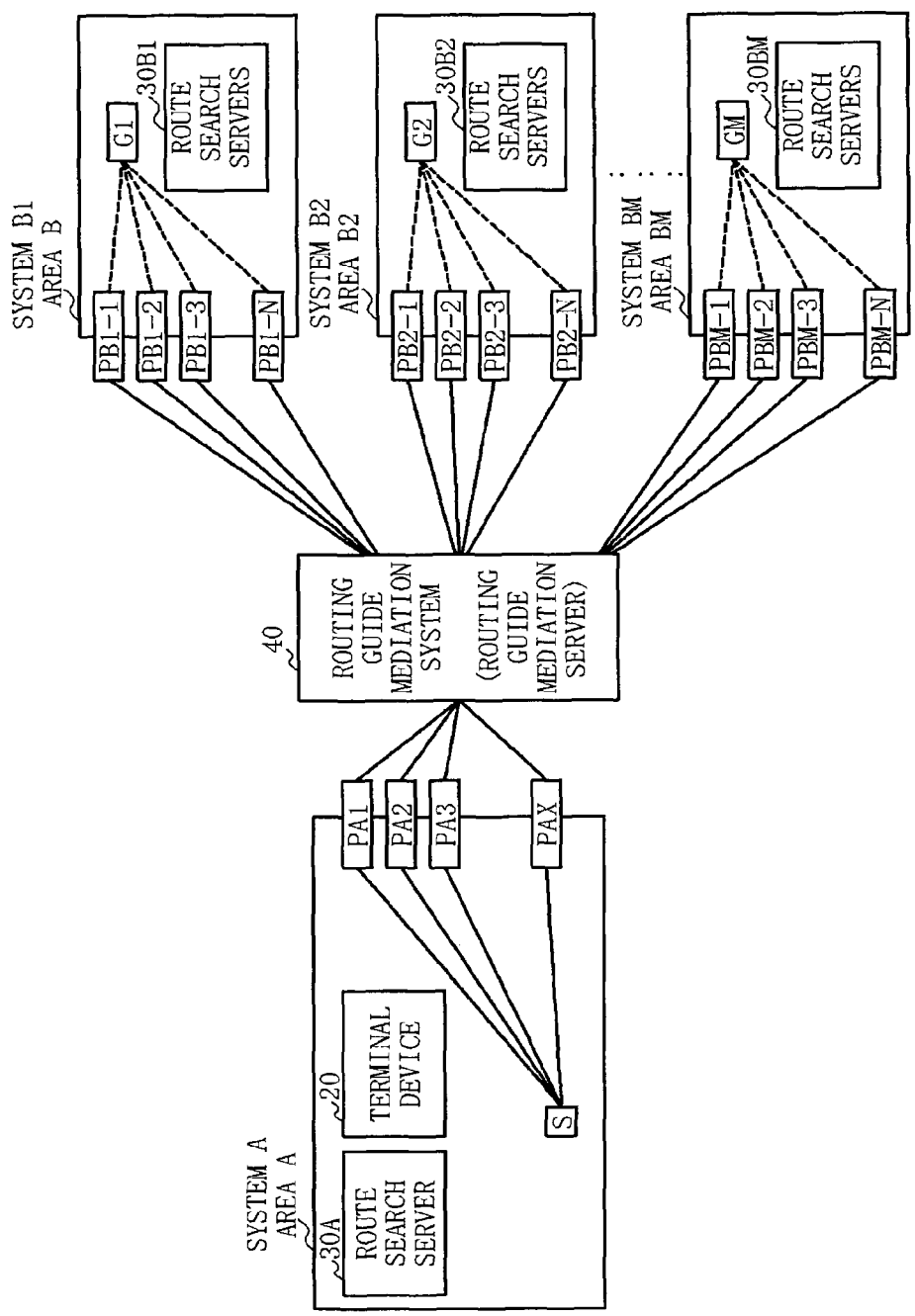
FIG. 1 is a system configuration diagram showing the configuration of a routing guide system in which the routing guide mediation server of an example of the present invention is used.

KEY TO SYMBOLS 20 terminal device
30A route search server
30B1 to 30BM route search servers
40 routing guide mediation server (routing guide mediation system)
41 candidate contact point and candidate route data editing means
42 candidate contact point network data
43 routing guide system determination means
44 communication means
45 area determination means
46 POI information-providing means

BEST MODE FOR CARRYING OUT THE INVENTION

Specific examples of the present invention are described in detail below using working examples and the drawings. However, the examples described below are used for illustrating a routing guide mediation system and routing guide mediation server for implementing the technical concepts of the present invention, and there is no intent to limit the present invention to the routing guide mediation system and routing guide mediation server described below. Equivalent application can also be made to the routing guide mediation system and routing guide mediation server of other embodiments included in the scope of the claims.

FIG. 1 is a system configuration diagram showing the configuration of the routing guide system of the present invention. As shown in FIG. 1, the routing guide mediation system is composed of a routing guide mediation server 40 connected via a network to numerous routing guide systems A and B1 to BM. The routing guide system A provides navigation service in area A, and the routing guide systems B1, B2 to BM provide navigation service to areas B1, B2 to BM, respectively.

For example, an area may be the service region of a single country, the service region of a plurality of countries, or the service region of a specific region in a single country. In FIG. 1, the departure-side area of the user of a terminal device 20 is expressed as area A and the areas on the side selected as the destination are expressed areas B1, B2 to BM.

A route search server 30A included in the routing guide system A is provided to the area A in order to provide a navigation service to area A, and in order to provide navigation service to the areas B, B2 to BM, route search servers 30B1, 30B2 to 30BM are provide to the respective areas. The terminal device 20 of the user is connected to the registered route search server 30A via the Internet, and can make desired route search requests.

Figure 11:
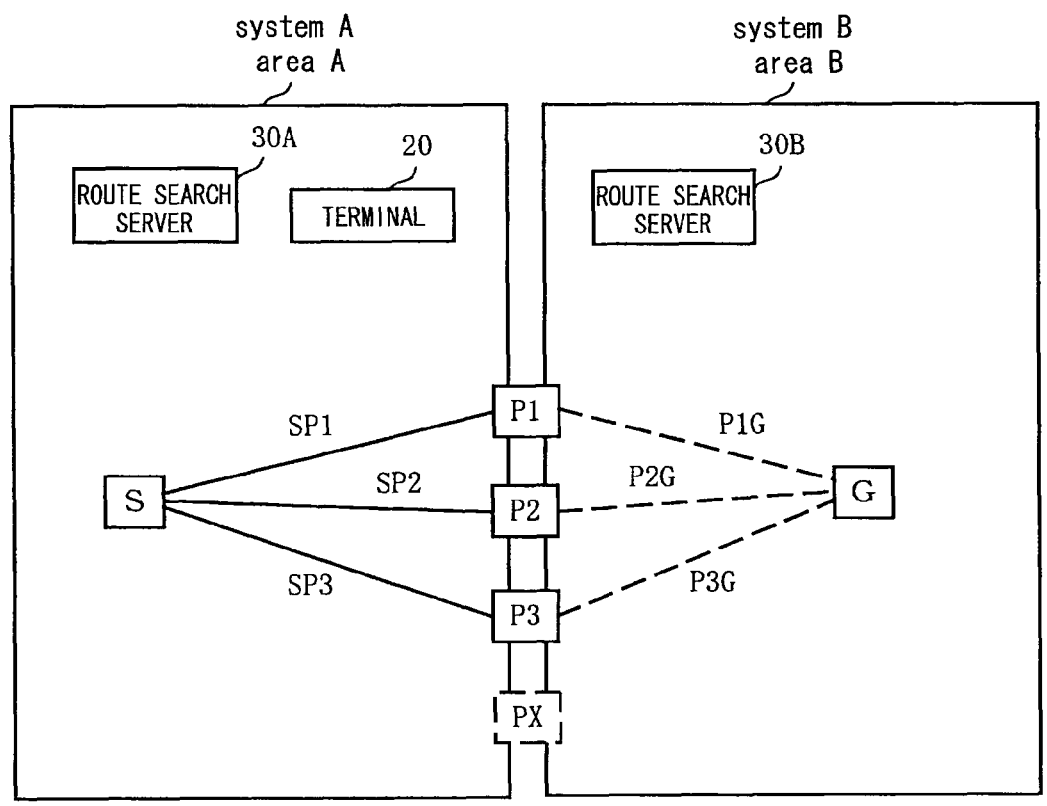
FIG. 11 is a system configuration diagram for describing the concept of routing guide servers in a plurality of routing guide systems in different service regions.

The configuration of the route search server 30A and the route search server 30B1, 30B2 to 30BM is provided with the same basic configuration as the server shown in FIG. 11; and the route search server 30A and the route search server 30B1, 30B2 to 30BM have only route search network data and map data that cover the areas for which each server provides service. Therefore, the route search server 30A cannot perform route searches in which the geographical points in the areas B1 to BM are used as departure points and destinations, and the route search server 30B1 to 30BM cannot perform route searches in which geographical points in the area A are used as departure points and destinations.

The route search server 30A and the route search server 30B1 to route search server 30BM are provided with information of candidate contact points PA1 to PAX, PB1-1 to PB1-N, . . . PBM-1 to PBM-N on the basis of links of movement means that connect areas in which other routing guide systems provide service and areas other than the areas in which the servers provide service, and are provided with connection information in each candidate contact point. The candidate contact point information is information that shows airports, terminal stations, as well as the position information in which movement to a different area is possible, which includes the longitude, latitude, and the like of a national border on a main thoroughfare.

The information of the geographical point of the border as the candidate contact point may contain links that reliably reach a candidate contact point. Connection information in each candidate contact point is, e.g., an operating schedule for airplanes if the candidate contact point is connected by air routes, and an operating schedule for regular liners if the candidate contact point is connected sea routes. The systems connected via an information mediation system 40 is not limited to a routing guide system, and various information-providing systems such as systems that provide POI (Point of Interest) information may be connected together.

As described above, each of the routing guide systems A, B1, B2 to BM that provide routing guide service to individual areas is connected via an information mediation system (routing guide mediation server) 40, and the routing guide mediation server 40 has candidate contact points and connection information thereto that are held in the route search servers 30A, 30B1, 30B2 to 30BM of the areas A, B1, B2 to BM. The routing guide mediation server 40 is provided with area information, the URL of the route search servers 30A, 30B1 to 30BM, and other connection information in areas in which the routing guide systems A, B1, B2 to BM provide service; and has area determination means for determining which area a geographical point belongs to in terms of the service provided by the routing guide system when a destination or another desired geographical point is specified.

The terminal device 20 registered to a user in the routing guide system A can set route search conditions, transmit a route search request to the route search server 30A, and provide guidance in accordance with an optimal route, a candidate route, or another guided route obtained as the route search result. Route search conditions include current position information acquired by GPS receiving means or other positioning means, or the departure point S, the destination G, and the departure time or arrival time specified by the user. The destination may be geographical information related to a destination desired by the user, may be composed of areas desired by the user and destination information requests related to the desired areas, and may furthermore be only a destination information request.

In the case that a route search request has been made from the terminal device 20 to the route search server 30A, the route search server 30A can reference the map data and route search network data, search for an optimal route from the departure point to the destination, and send the optimal route information to the terminal device 20 to provide route guidance as long as the departure point S and destination G for which route search conditions have been set by the terminal device 20 are within the area for which the routing guide system A provides service. This route guidance is the same as the function of an ordinary routing guide system and routing guide server.

The route search server 30A transmits a route search request to the routing guide mediation server 40 when the destination G set as a route search condition is not within the area for which the routing guide system A provides service as indicated by G1 to GM shown in FIG. 1. The routing guide mediation server 40 specifies a routing guide system in which the destinations G1 to GM are the service area among the destinations G1 to GM of the route search conditions received from the route search server 30A. For example, the routing guide system B1 and the route search server 30B1 are specified in the case that the destination is G1 within the area B1.

Here, the destination information request is a request for POI (Point of Interest) information about various facilities or the like as a selection option in the case that the destination cannot be specified. For example, when an area name has been specified and a destination information request has been sent in order to acquire POI information that can be selected within the specified area, the destination G is specified from the information, the POI category information is requested, and a selection is made from the POI category information to specify the area name and destination G. The routing guide mediation server 40 is provided with POI information-providing means that has POI information in order to achieve such a function.

Next, the configuration of the terminal device 20, the route search server 30A, and the routing guide mediation server 40 provided to a routing guide system will be described with reference to FIGS. 2 to 4.

Figure 2:
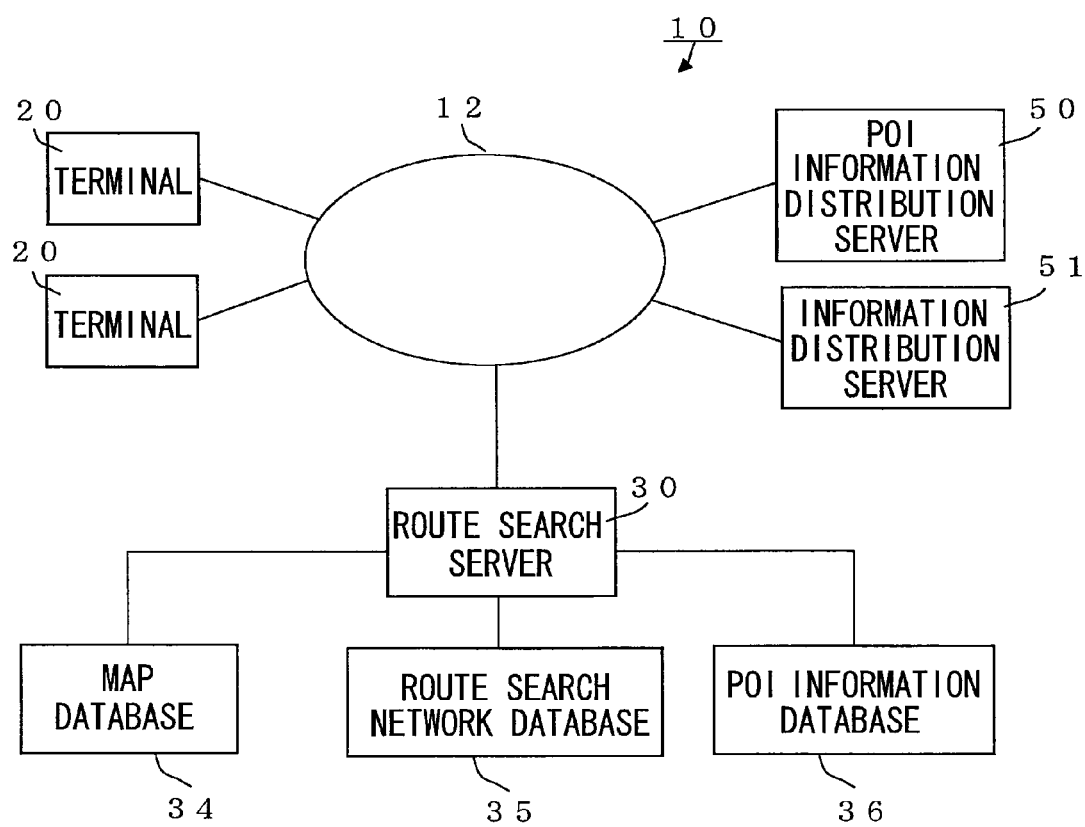
FIG. 2 is a system configuration diagram showing the concept of a routing guide system in which a specific area is used as a service area.

FIG. 2 is a system configuration diagram showing the configuration of the routing guide system A in FIG. 1. The routing guide system A is provided with a terminal device 20 and a route search server 30A that are connected via a network 12, as shown in FIG. 1. The routing guide system A is a system in which a specific country or region is the area in which service for route searches and route guidance is provided. Therefore, the route search server 30A has only map data and route search network data that covers the service area.

The routing guide system A is provided with a POI information distribution server 50 that provides the location of POI (Point of Interest), service content, and other detailed information that belonging to various categories; a various-information distribution server 51 that provides other information such as music, images, and other content; and other servers. The route search server 30A can acquire required data from the POI information distribution server 50 and the alternative-information distribution server 51 by way of the network 12, and add the data to its own database. Also, a search request can similarly be sent to the POI information distribution server 50 and the alternative-information distribution server 51 to acquire a desired search result.

The routing guide system A of the present invention is not limited to the configuration described above, and it is also possible for the route search server 30A to have the functions of a map distribution server for distributing maps of POI locations in addition to a navigation service function. The terminal device 20 may also be a mobile telephone, PDA, music player, portable game machine, or another mobile device, or may be a mobile personal computer (PC).

The route search server 30A is provided with a map database 34 and a route search network data 35, and when a route search request is received from the terminal device 20 and a route search is made with reference to the route search network data 35. The route search server 30A has a common navigation function for transmitting to the terminal device 20 the guidance route data of candidate routes and the optimal route obtained from the results of a route search. When a request is received for map data for a desired geographical point or via a POI search, reference is made to the map database 34, the applicable map data is read out and distributed to the terminal device 20.

The route search network data 35 is provided with road network data for searching for a route by walking or by automobile, and transportation network data for searching for a route for moving by railroad, aircraft, ship, bus, or another mode of transportation. The road network data expresses links that connects nodes together, the nodes being connecting points and intersections of roads; and the time required to move at a standard speed is associated with each link as a cost of the link.

The transportation network data expresses airports, seaports, and stations of routes of various modes of transportation as nodes using links that connect the nodes together, with the individual trains, aircraft, ships, buses, and other transportation means forming the links; and is composed of data in which the departure time from a node and the arrival time at a node are correlated based on operation timetables.

The route search conditions in which the departure point, destination, movement means (by walking, automobile, mode of transportation), departure time, and the like are specified are set in the terminal device 20, and when the route search server 30A receives a route search request, the route search server 30A references network data of the route search network data 35, searches for an optimal route or a plurality of candidate routes that match the route search conditions, and returns the information of the routes to the terminal device 20. When a route is selected in the terminal device 20 and a route search request is made, the map data, the data of the selected route, or guidance data for providing guidance along the route is transmitted to the terminal device 20.

Figure 3:
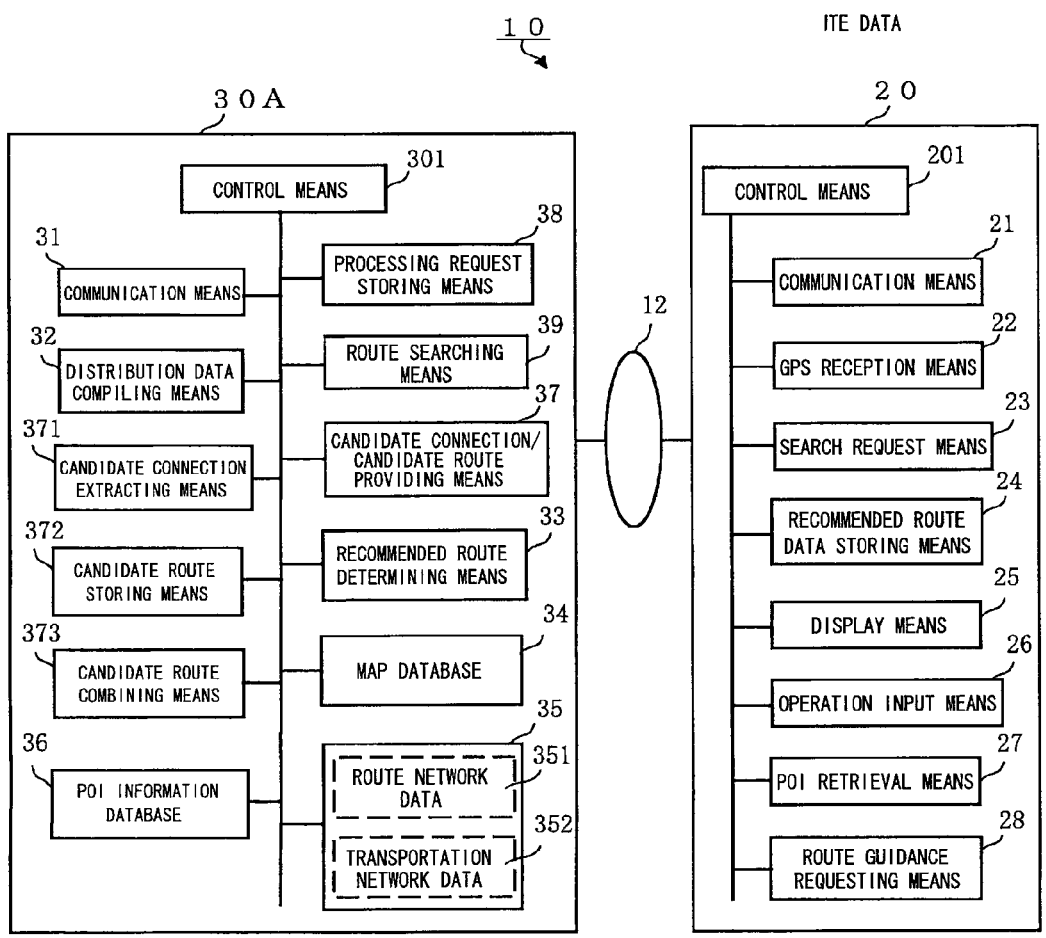
FIG. 3 is a block diagram showing the configuration of the terminal device and route search server constituting a routing guide system in which a specific area is used as a service area.

FIG. 3 is a block diagram showing the configuration of the terminal device 20 and route search server 30A constituting a routing guide system A shown in FIG. 2. The terminal device 20 is a terminal that can receive navigation service, and is composed of control means 201, communication means 21, GPS receiving means 22, search request means 23, recommended route data storage means 24, display means 25, operation input means 26, POI search means 27, route guidance request means 28, and the like. The operation input means 26 is composed of character input keys, selection keys, cursor keys for selecting setting items or the like on a menu screen displayed on the display screen, and other keys.

As described above, the route search server 30A is provided with a map database 34 containing map data, a route search network database 35 containing road network data 351 and transportation network data 352 for route searching, and a POI information database 36 for collecting POI names and position information. In the case that the route search server 30A has a function for searching for a route that uses walking and public modes of transportation and providing guidance to the terminal device 20, a route is searched using the road network data 351 and transportation network data 352 contained in the route search network database 35.

The route search server 30A is composed of control means 301, communication means 31, distribution data editing means 32, recommended route determination means 33, a map database 34, a route search network database 35, a POI information database 36, candidate contact point- and candidate route-providing means 37, candidate contact point extraction means 371, candidate route storage means 372, candidate route connection means 373, processing request storage means 38, route search means 39, and the like.

When the route search server 30A receives a request for a route search, a POI search, or map distribution from the terminal device 20, the request is temporarily stored in the processing request storage means 38. In the case that the request is a route search request, the route search means 39 references the route search network database 35 and searches for an optimal route or a recommended route (guidance route). The data of the guidance route thus searched is edited into distribution data for the terminal device 20 by the distribution data editing means 32 and is distributed to the terminal device 20. Map data that includes the guidance route is read out from the map database 34 and distributed to the terminal device 20.

The route search server 30A temporarily stores a route search request from the terminal device 20 in the processing request storage means 38 when a route search request is received. The route search means 39 references a route search network database 35 in accordance with the route search conditions included in the route search request stored in the processing request storage means 38 and searches for a plurality of candidate routes from the departure point to the destination.

In the case that the route search request is an ordinary request for a route search, i.e., a departure point and a destination that are geographical points within the service area of the route search server 30A, the route search means 39 references the route search network database 35 and carries out an ordinary route search, and provides the search results to the terminal device 20 by searching for an optimal route and a plurality of candidate routes in accordance with the settings of the route search conditions. The data of the optimal route, the candidate routes, and other guidance routes obtained as a result of the search are transmitted to the terminal device 20 together with map data read out from the map database 34. This route search method is the same method as that used in the route search server in an ordinary navigation system.

In a route search request for the terminal device 20, the route search request is transmitted to the routing guide mediation server 40 in the case that the departure point S is within the service area of the route search server 30A such as the departure point S of FIG. 1, for example, and the destination G is a geographical point outside of the service area of the route search server 30A such as the destination G1.

Figure 4:
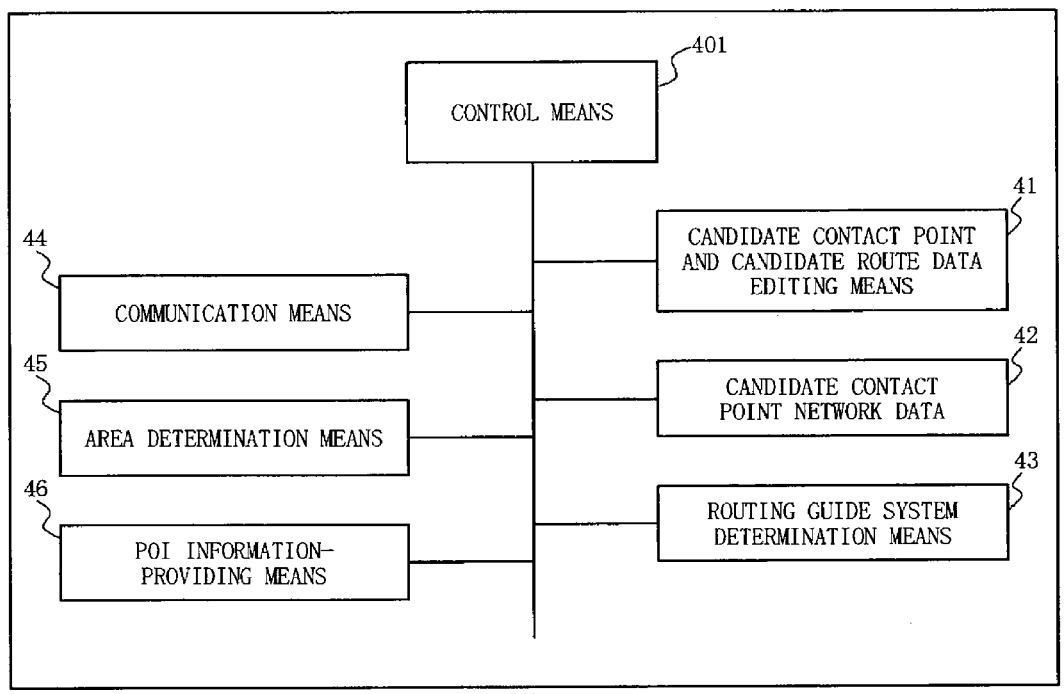
FIG. 4 is a block diagram showing the configuration of a routing guide mediation server provided to the routing guide mediation system.

The routing guide mediation server 40 is provided with control means 401, candidate contact point data editing means 41, contact point network data 42, routing guide system determination means 43, communication means 44, area determination means 45, POI information-providing means 46, and the like, as shown in FIG. 4. The operation of the routing guide system and the routing guide mediation server 40 are described below in sequence for (1) the case in which geographical point information of the destination has been set in the terminal device 20, (2) the case in which the area name and destination information request related to the destination have been set in the terminal device 20, and (3) the case in which only a destination information request has been set in the terminal device 20.

(1) Operation in the case that geographical point information of the destination has been set in the terminal device 20:

When the route search server 30A receives route search conditions that includes the departure point, destination, and time information from the terminal device 20, the control means 301 references the map database 34 and determines whether the destination contained in the route search conditions is a geographical point information exists in the area A, which is within the local area.

In the case that it is determined that the destination is geographical point information within the local area, the route search means 39 carries out an ordinary route search and the recommended route determination means 33 determines a recommended route (optimal route) in relation to the candidate routes thus obtained. The distribution data editing means 32 edits the data of the determined recommended route as guidance route information, and the communication means 31 transmits the guidance route information to the terminal device 20. The terminal device 20 temporarily stores the guidance route information received from the route search server 30A in the recommended route data storage means 24 and displays the guidance rout information on the display means 25.

On the other hand, in the case that the destination is determined not to be geographical point information within the local area, the candidate contact point extraction means 371 extracts the candidate contact points (PA1 to PAX) within the local area, and the route search means 39 carries out a route search from the departure point S to candidate contact points on the basis of the extracted candidate contact points. Candidate route information that includes a predetermined number of candidate routes obtained by the route search and the required time related to the candidate routes is sent as a processing request together with the information of the destination G (position information of the destination G) and the information of the candidate contact points to the routing guide mediation server 40 via the communication means 31.

In the routing guide mediation server 40, the area determination means 45 determines which area the destination belongs to determine which routing guide system (routing guide systems B1 to BM) will provide service, on the basis of the destination G included in the processing request received from the route search server 30A. The case in which the destination is G1 will be described as an example.

In the case that the destination is G1, the area determination means 45 determines that the destination is in the area B1 (see FIG. 1). Next, the candidate contact point and candidate route data editing means 41 references the candidate contact point network data 42 and calculates on the basis of the candidate route information received from the route search server 30A the candidate route information (including the candidate routes and their required times) that takes into account the connect information between the candidate contact points (from PA1 to PAX to PB1-1 to PB1-N) from the area A to the candidate contact points of the area B1 on the basis of the candidate contact points (PB1-1 to PB1-N) of area B1 determined by the area determination means 45 and the time information (e.g., operation timetable of aircraft and liners) included in the candidate route information received from the route search server 30A.

Next, the routing guide system determination means 43 determines that the routing guide system that provides the routing guide service to area B1 is the routing guide system B1. When it is determined that the routing guide system B1 of the area to which the destination G1 belongs is B1, the routing guide mediation server 40 transmits the candidate route information that includes the candidate contact points (PB1-1 to PB1-N) on the area B1 side and the geographical point information of the destination G1 to the route search server 30B1 of the routing guide system B1.

In the route search system B1 (route search server 30B1), the route search means 39 carries out a route search from the candidate contact points (PB1-1 to PB1-N) included in the candidate route information to the destination G1 on the basis of the candidate route information thus received and the geographical point information of the destination G1. The recommended route determination means 33 determines a recommended route (optimal route) having shortest total required time on the basis of the candidate route obtained as a result of the route search and the candidate route information (including the required time of the candidate routes from the departure point S to the candidate contact points PA1 to PAX, and the connection information between the candidate contact points to PB1-1 to PB1-N) received from the routing guide mediation server 40. The distribution data editing means 32 creates link data for each link constituting the recommended route (a candidate route from any of the candidate contact points PB1-1 to PB1-N to the destination G1).

The routing guide system B1 transmits the link data showing the recommended route and the contact point information used by the recommended route to the routing guide mediation server 40 via the communication means 31. The information to be transmitted to the routing guide mediation server 40 is not limited to contact point information and link data, but may also include estimated time of arrival calculated from the recommended route, required time, and other time information. It is also possible to directly transmit the information from the route search server 30B1 to the route search server 30A without going through the routing guide mediation system (routing guide mediation server 40) in the case that the information from the route search server 30A that made the route search request is included as the transmission address of the information in the route search request set by the terminal device 20.

In the operation of the servers and the terminal device 20 described above, the routing guide mediation server 40 functions so as to specify the routing guide system B1 in which the area to which the destination G1 belongs is the service area and mediates the sending and receiving of information between the route search server 30A and the route search server 30B1; and the operation of the route search server 30A and the operation of the route search server 30B1 have the same operation as the servers in the routing guide systems shown in FIG. 11. The details are described in the specification of International Patent Application PCT/JP2008/058182.

The routing guide mediation server 40 transmits the link data showing the recommended route and the contact point information received from the route search server 30B1 to the route search server 30A, the distribution data editing means 32 of the route search server 30A edits the route guidance information into data to be transmitted to the terminal device 20 and transmits the data to the terminal device 20. The terminal device 20 temporarily stores the received guidance route information in the recommended route data storage means 24 and displays the guidance rout information on the display means 25.

The determination of the recommended route (the optimal route having the shortest total required time) may be carried out by the route search server 30A which received the calculated candidate route information from the route search server 30B1. In this case, the optimal route information in the area B1 is transmitted to the route search server 30A, and the route search server 30B1 is requested to transmit the link data showing the recommended route determined by the route search server 30A.

It is also possible use a configuration in which the routing guide mediation server 40 is provided with recommended route determination means to determine an optimal route having the shortest required time as the recommended route from the candidate route information (candidate contact points, required time, candidate route links, and other information) searched by the route search server 30A and the route search server 30B1, and to provide the information of the recommended route to the terminal device 20 via the route search server 30A. It is also possible to use a configuration in which the information is transmitted directly from the routing guide mediation server 40 to the terminal device 20 without going through the route search server 30A in the case that the information from the route search server 30A that made the route search request is included as the transmission address of the information in the route search request set by the terminal device 20.

(2) Operation in the case that the area name and destination information request related to the destination have been set in the terminal device 20:

When an area name desired to be selected as the destination information and a destination information request are inputted from the operation input means of the terminal device 20 (user) in area A, the terminal device 20 transmits the area name and the destination information request inputted as a route search request (processing request) to the route search server 30A via a network.

When the route search server 30A receives the route search conditions (route search request) that include the area name and destination information request from the terminal device 20, the route search server 30A transmits the processing request to the routing guide mediation server 40. The routing guide mediation server 40 has routing guide system determination means 43 that determines on the basis of the received area name the route search system that will provide the routing guide service to the area that corresponds to the area name.

For example, when the routing guide system determination means 43 determines that the routing guide system is the route search system 30B1 (e.g., from the area name B1) in the case that the specified area is B1, the routing guide mediation server 40 makes a request for POI information from the area determination means 46 to the route search server 30B1, and acquires the POI information related to the area B1 from the route search server 30B1.

The routing guide mediation server 40 transmits the acquired POI information related to the area B1 to the route search server 30A. When the route search server 30A transmits the acquired POI information related to the area B1 to the terminal device 20, the terminal device 20 having received the POI information displays the POI information on the display means 25 and receives instruction (e.g., POI selection or the like) from the user.

When the terminal device 20 receives input for selecting a specific POI as the destination on the basis of the POI information related to the area B1, the geographical point of the selected POI is set as the destination G, and a route search request that has the current position information or the departure point information and the departure time or arrival time as route search conditions is transmitted to the route search server 30A; and the route search server 30A transmits the route search request to the routing guide mediation server 40. The operation of the servers, i.e., the routing guide mediation server 40, the route search server 30A, and the route search server 30B1 after the destination has been determined is the same as the operation described in (1) above and a description thereof is omitted.

The POI information provided by the routing guide mediation server 40 is not limited to information related to an individual POI that can be set as the destination, and may also be POI category information, which is a higher-order hierarchy in the case that the information is POI information created with a hierarchical structure. For example, in the case that there are too many POI related to the desired area, it is also possible for the user who acquired the POI category information to select POI category information and again acquire obtainable POI information via the routing guide mediation server 40, and then select a desired POI and specify a destination G.

(3) Operation in the case that only a destination information request is set in the terminal device 20:

When only a destination information request is inputted by a user in area A, the terminal device 20 transmits only the destination information request to the route search server 30A via a network. The route search server 30A receives only the destination information request from the terminal device 20, and transmits the destination information request to the routing guide mediation server 40.

When the routing guide mediation server 40 receives a destination information request, the POI information-providing means 46 acquires POI category information that can be specified as a destination information request from the routing guide systems B1, B2, . . . , BM that are connected to the routing guide mediation server 40. POI category information is higher-order hierarchy information of individual POI information that can specify the destination G.

The routing guide mediation server 40 transmits the acquired POI category information to the route search server 30A. The route search server 30A transmits the POI category information to the terminal device 20. The terminal device 20 displays the POI category information thus received on the display screen of the display means 25, and when the POI category information selected (specified) by the user using the operation input means 26 is received, the specified POI category information and the destination information request are again sent to the routing guide mediation server 40.

The routing guide mediation server 40 determines with the aid of the area determination means 45 the area of the route search system (route search server 30B1 or the like) that is providing the POI category information that corresponds to the POI category information received from the route search server 30A, and transmits a list of the area names to the route search server 30A. The route search server 30A again transmits the information of list of area names received from the routing guide mediation server 40 to the terminal device 20 and the terminal device 20 displays the information.

When a single area is specified by the user from the list of area names that correspond to the POI category information specified by the used, the terminal device 20 retransmits the initially specified POI category information, area name, and destination information request to the route search server 30A.

The route search server 30A transmits the POI category information, area name, and destination information request received from the terminal device 20 to the routing guide mediation server 40. In the routing guide mediation server 40, the routing guide system that provides service to an area is determined based on the area name specified by the routing guide system determination means 43.

For example, when the specified area name is area B1, POI information that corresponds to the POI category information specified in advance is acquired from the routing guide system B1 that provides service to the area B1. When the routing guide mediation server 40 transmits the POI category information acquired from the routing guide system B1 to the route search server 30A, the route search server 30A transmits the POI information to the terminal device 20.

The terminal device 20 displays the received POI information on the display means 25 and transmits route search conditions to the route search server 30A using the POI information selected by the user as destination G information. The operation of the servers, i.e., the routing guide mediation server 40, the route search server 30A, and the route search server 30B1 after the destination G has been determined is the same as the operation described in (1) above and a description thereof is omitted.

As described above, in route search and route guidance in which the departure point S and destination G straddle areas in which different routing guide services are provided, candidate contact points that connect areas and connection information of the candidate contact points are exchanged by the route search servers 30A, 30B, and the like that provide the routing guide service to their respective areas via the routing guide mediation server 40, and candidate routes from the departure point to the candidate contact points and candidate routes from the candidate contact points to the destination are searched by the route search server 30A, 30B1, respectively, whereby the recommended route having the shortest total required time can be determined from among the candidate routes linked together at the candidate contact points on the basis of the candidate routes and their data related to the required time and links. Therefore, each route search server is not required to hold the information of another route search server, the information does not need to be updated, and route searches and route-guidance routes that straddle areas in which different routing guide services are provided can be readily coordinated.

In the same manner that a user selects a destination from the destination information present in a local area, it is also possible to select a destination in another area by acquiring and displaying the category information or the POI information for areas in which individual route search server 30A and the like do not provide service by going through a routing guide mediation server 40 (routing guide mediation system). In other words, route searches and route guidance can be coordinated from one area to many areas. It also becomes possible to connect a plurality of service systems in the same area and provide various information without limitation to route searches and route guidance service.

A hierarchical system can be implemented by disposing a routing guide mediation server 40 in each large area, thereby contributing to load dispersion and expandability of the routing guide mediation server 40. The cost of data maintenance is low because the routing guide mediation server can provide integrated management even if the routing guide systems do not have information related to connecting to candidate contact points for air routes, sea routes, and other for operation data. Similarly, information provided by the routing guide systems is more readily provided in a service having greater locality by managing basic geographical point information and map data in the routing guide mediation server and placing only detailed information in the routing guide systems.

Also, in the case that a route search is carried out for a single destination, not only can individual POI provided in a local area be known, but individual POI provided in other areas can also be known at the same time by requesting POI category information, and the breadth of the destination setting is increased.

Furthermore, the routing guide mediation server can be configured to mediate charges to a terminal device and thereby process transactions by totaling charges by a local area route search server without the inconvenience of registration that allows charges to be made to a credit card in each routing guide system.

Figure 5:
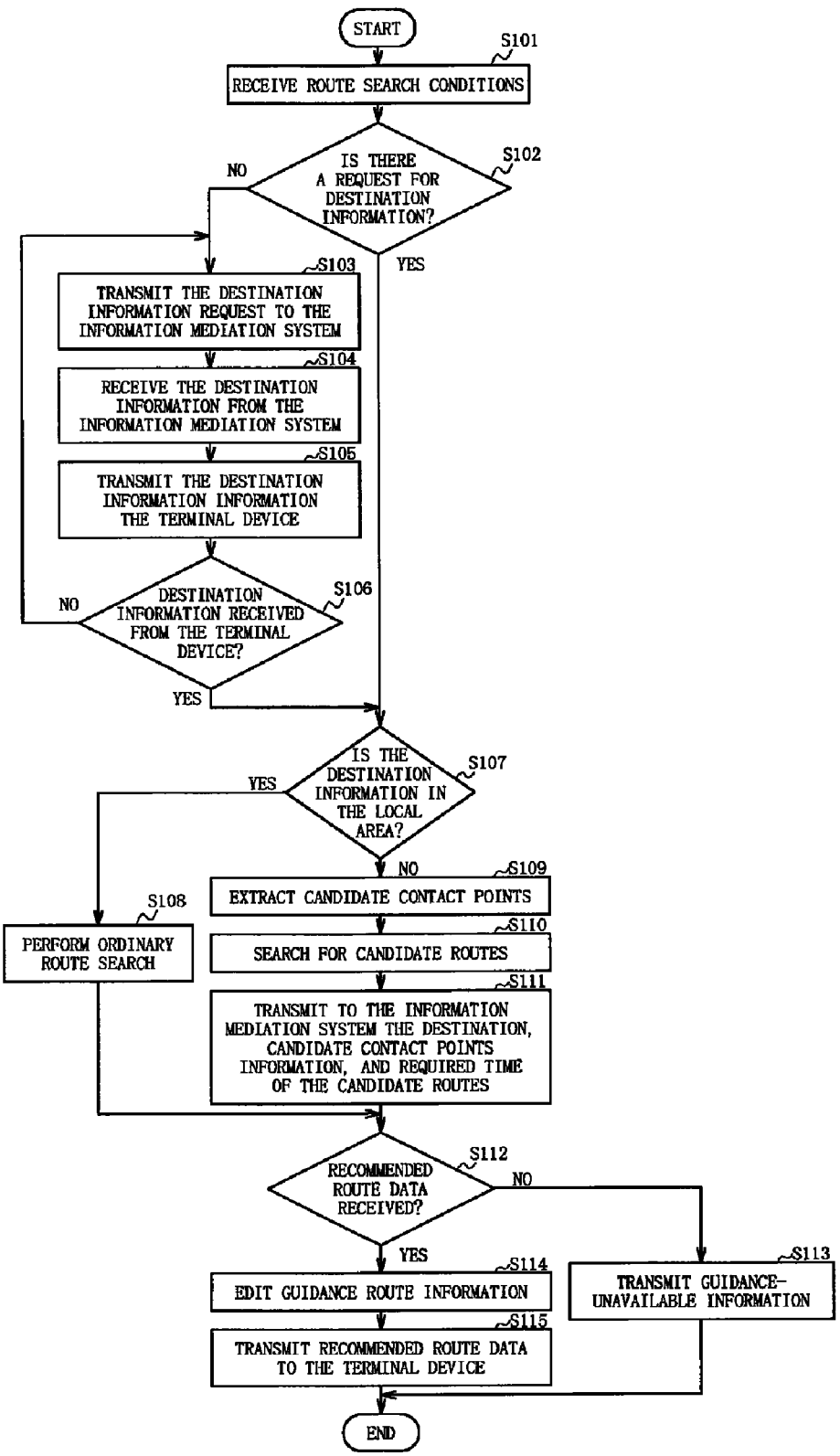
FIG. 5 is a flowchart showing the processing procedures of the route search server on the departure point side.

Next, the processing procedures of the route search server, the routing guide mediation server, and the terminal device of the examples of the present invention will be described with reference to the flowchart shown in FIGS. 5 to 8. FIG. 5 is a flowchart showing the processing procedures of the route search server (e.g., the route search server 30A) on the departure point side. When the route search server 30A receives the route search conditions from the terminal device 20 in step S101, as shown in FIG. 5, the control means 301 determines in step S102 whether information (referred to as destination information) that specifies the geographical point of the destination G is included. The process proceeds to step S107 in the case that destination information is included.

The process proceeds to step S103 in the case that destination information is not included. The case in which destination information is not included is the case in which POI category information, or a destination information request is received together with the area name, or the case in which only a destination information request is received.

In step S103, the route search server 30A transmits to the routing guide mediation server 40 the POI category information and the destination information request together with the area name received from the terminal device 20 in step S101. When the destination information is received from the routing guide mediation server 40 (routing guide mediation system) in step S104, the route search server 30A transmits the destination information thus received to the terminal device 20 in step S105.

The process proceeds to step S107 in the case that the route search server 30A has received destination information from the terminal device 20 in step S106. The process proceeds to step S103 in the case that the destination information has not been received from the terminal device 20.

For example, only a destination information request is transmitted to the routing guide mediation server 40 in step S103, and the POI category information is received from the routing guide mediation server 40 in step S104. In such a case, the process proceeds to step S105, and when the POI category information as destination information is transmitted to the terminal device 20, the route search server 30A receives the POI category information specified by the terminal device 20 among the POI category information from the routing guide mediation server 40 in step S106.

In step S106, since the POI category information does not specify a destination G, the process proceeds to step S103 and a request that destination information be provided is again transmitted together with the POI category information to the routing guide mediation server 40. In this manner, when a destination information request is made to the routing guide mediation server 40, the POI category information, area name, POI name (or address, latitude and longitude, or the like) are specified, and the ultimate destination G is specified, the process proceeds to step S107.

In step S107, the control means 301 determines whether the destination G is in a local area from the destination information. In the case that the position (geographical point) of the destination G is in the local area, the process proceeds to step S108 and the route search means 39 carries out an ordinary route search.

In the case that the destination G is outside the local area as is G1, for example, (see FIG. 1), the process proceeds to step S109 and the candidate contact point extraction means 371 extracts the destination candidate contact points PA1 to PAX (see FIG. 1). Next, in step S110, the route search means 39 carries out a route search from departure point S to the candidate contact points extracted in step S109, and calculates the candidate routes. The candidate route may be a single route, or a predetermined number of routes may be specified in advance as candidate routes.

The process proceeds to step S111, and the candidate contact point- and candidate route-providing means 37 transmits to the routing guide mediation server 40 the destination G, the candidate contact points information, and the required time calculated based on the candidate routes calculated in step S110. In step S112, if the route search server 30A has received the recommended route data from the routing guide mediation server 40, the process proceeds to step S114.

In the case that recommended route data cannot be received from the routing guide mediation server 40 in step S112, the process proceeds to step S113. Cases in which recommended route data cannot be received from the routing guide mediation server 40 include the case in which a route that arrives at the destination G cannot be searched, or the case in which guidance-unavailable information is received. In step S113, the route search server 30A transmits the guidance-unavailable information to the terminal device 20.

When the route search server 30A receives recommended route data from the routing guide mediation server 40 in step S112, the distribution data editing means 32 edits the recommended route data in step S114 into guidance route information to be sent to the terminal device 20. The process proceeds to step S115 and the route search server 30A transmits the guidance route information which includes the recommended route data to the terminal device 20 and the process ends.

Figure 6:
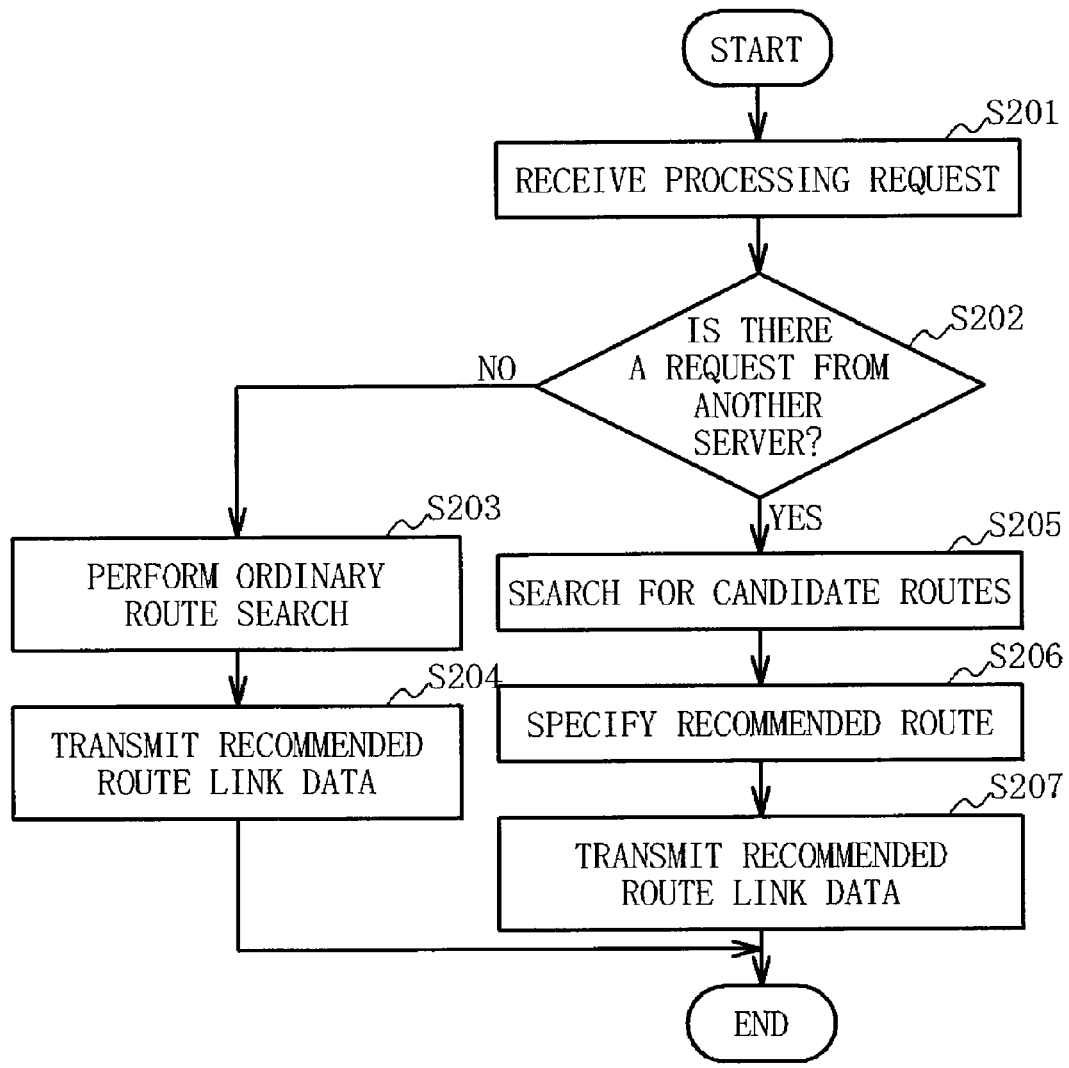
FIG. 6 is a flowchart showing the processing procedures of the route search server on the destination side.

FIG. 6 is a flowchart showing the operation of the route search server 30B1 for the case in which the route search server is on the destination G side, e.g., the destination G1 (see FIG. 1). As shown in FIG. 6, when the route search server 30B1 receives a processing request from the routing guide mediation server 40 in step S201, the process proceeds to step S202, and it is determined whether the processing request is from another routing guide system (route search server). In the case that the processing request is not from another route search server, the process proceeds to step S203 and the route search means 39 carries out an ordinary route search.

In the case that the request is from the terminal device 20 in the local area, the process proceeds to step S201 when the route search processing is completed, the guidance route information including link data of the recommended route is transmitted to the terminal device 20 that transmitted the processing request in the local area and the processing is ended.

In the case that the processing request is from another route search server, the process proceeds to step S205, and the route search means 39 searches for candidate routes from the candidate contact points to the destination G1 on the basis of the destination G1 included in the processing request and the information of the candidate contact points (PB1-1 to PB1-N) extracted by the candidate contact point extraction means 371 on the basis of the candidate contact points PA1 to PAX received via the routing guide mediation server 40.

Next, in step S206, the candidate route connection means 373 links the required time of the candidate routes to the candidate contact points (PA1 to PAX) included in the processing request received via the routing guide mediation server 40, and the required time of the candidate routes from the candidate contact points (PB1-1 to PB1-N) calculated in step S205 to the destination G1, on the basis of the respective candidate contact points; and specifies the candidate route having the shortest total required time as the recommended route.

When the recommended route is specified, the process proceeds to step S207, and the route search server 30B transmits to the routing guide mediation server 40 the link data showing the candidate route (the candidate route from any of the candidate contact points PB1-1 to PB1-N to the destination G1) specified as the recommended route; and the processing comes to an end.

Figure 7:
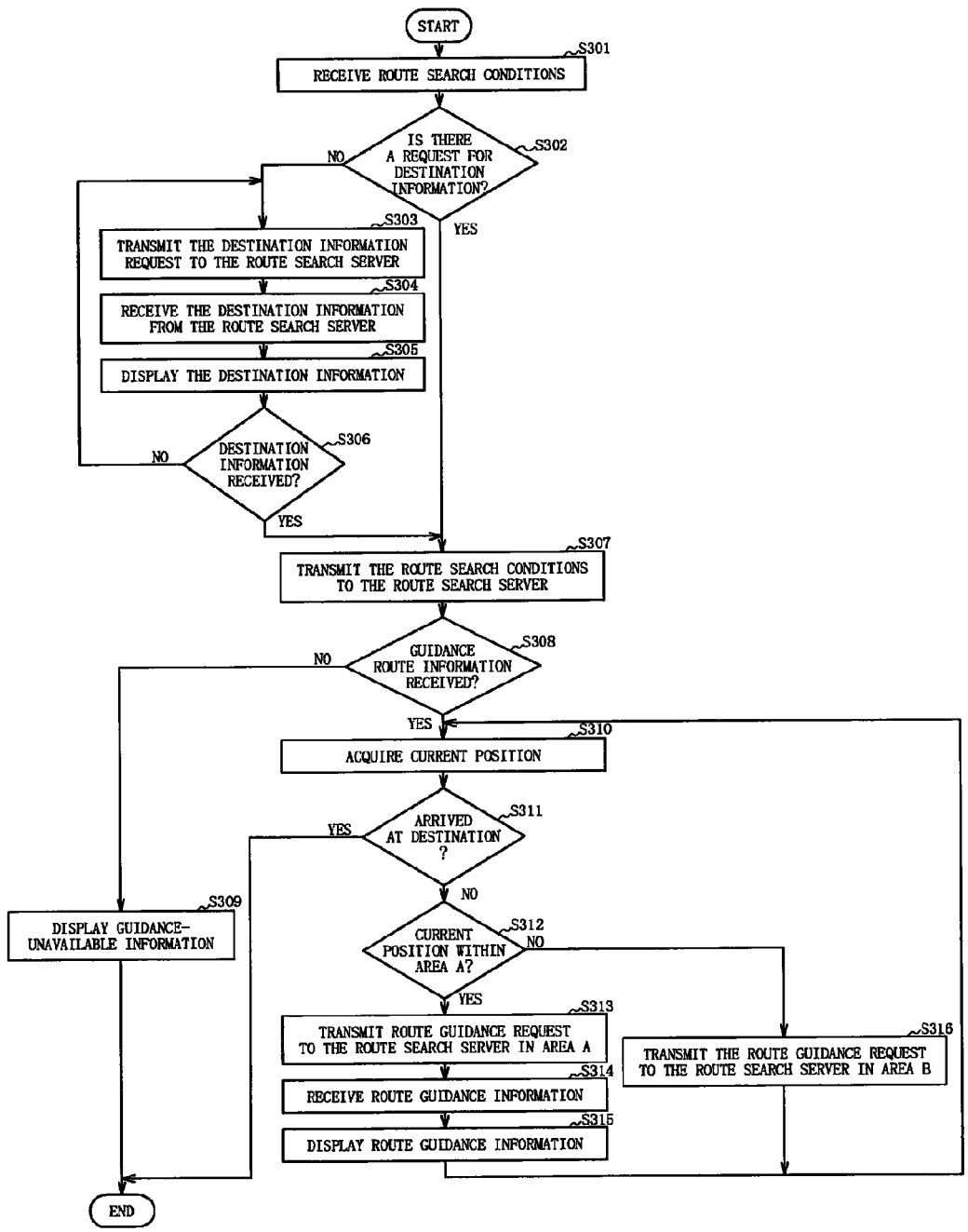
FIG. 7 is a flowchart showing the processing procedures of the terminal device.

FIG. 7 is a flowchart showing the processing procedures of the terminal device 20. When the terminal device 20 receives input of the route search conditions from the user in step S301, as shown in FIG. 7, it is determined whether geographical point information (position information) of the destination G is included in the route search conditions received in step S302. In the case that destination information is included, the process proceeds to step S307.

In the case that geographical point information of the destination G is not included, in other words, in the case that a destination information request is not included, the process proceeds to step S303, and the search request means 23 transmits the destination information request to the route search server 30A. In step S304, the terminal device 20 displays the destination information received in step S305 on the display means 25 when destination information is received from the route search server 30A.

Next, the process proceeds to step S306, and when a specification of the destination information is received from the user, the process proceeds to step S307. In the case that destination information has not been specified by the user, the process proceeds to step S303.

For example, in step S303, only the destination information request is transmitted to the route search server 30A, and the POI category information is received from the route search server 30A in step S304. The process proceeds to step S305, and when the POI category information is displayed on the terminal device 20 as destination information, and in step S306, the terminal device 20 receives the POI category information specified by the user using the operation input means 26 from the displayed destination information.

Since this is not information that specifies the geographical point of the destination G, the destination information request and the POI category information are retransmitted to the route search server 30A in the processing of step S303. As described above, the POI information can be narrowed and the destination 0 can be specified.

The process proceeds to step S307, and the search request means 23 transmits the route search request that includes the route search conditions to the route search server 30A. In step S308, in the case that the terminal device 20 does not receive guidance route information (recommended route data) from the route search server 30A, guidance-unavailable information is displayed in step S309 and processing comes to an end.

On the other hand, in the case that the terminal device 20 has received guidance route information from the route search server 30A in step S308, the process proceeds to step S310. In step S310, the terminal device 20 acquires current position information as measured by the GPS receiving means 22, and it is determined in step S311 whether the current position has arrived at the destination G.

In the case that the current position of the terminal device 20 has arrived at the destination G, the processing comes to an end. In the case that the current position has not arrived at the destination G, the process proceeds to step S312, and it is determined whether the current position acquired in step S310 is within the area.

In the case that the current position is within the area A, the process proceeds to step S313, and the route guidance request is transmitted to the route search server 30A of the area A on the basis of the guidance route information that includes the recommended route data received via the routing guide mediation server 40 and route search server 30A. In step S314, when the route guidance information is received from the route search server 30A, the process proceeds to step S315 and displays the route guidance information on the display means 25, and the process proceeds to step S310.

On the other hand, in the case that the user in possession of the terminal device 20 moves between areas and it is determined in step S312 that the current position is determined to not be in area A, the process proceeds to step S316, and the route guidance request is transmitted to the route search server 30B1 on the destination G (e.g., G1) side on the basis of the guidance route information which includes the recommended route data received via the routing guide mediation server 40 and the route search server 30A. The process then proceeds to step S310.

As described above, the terminal device 20 references the current position and makes a route search request in accordance with the route guidance information to the route search server 30A that provides routing guide service to the local area in the case that the current position is in the local area; and in the case that the current position is not in the local area, the terminal device 20 makes a route search request to the route search server 30B1 which provides routing guide service in another area (e.g., the area of the routing guide system B1) on the basis of the guidance route information (recommended route data) in accordance with the recommended route link data included in the guidance route information. Therefore, even when the map data or the like of another area cannot be acquired in the local area, the required route guidance information can be suitably acquired when the terminal device has moved into another area.

Figure 8:
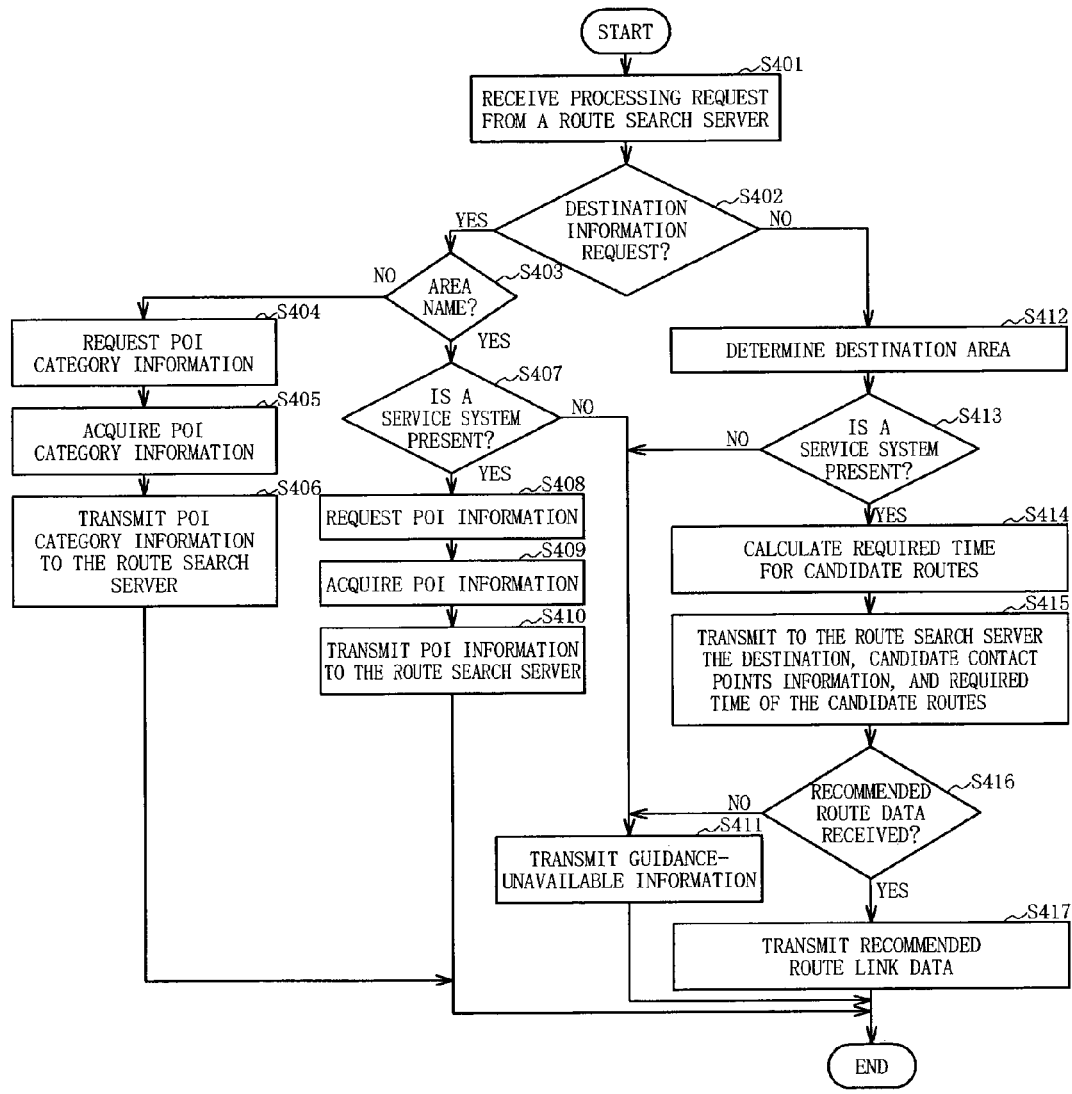
FIG. 8 is a flowchart showing the processing procedures of the routing guide mediation server.

FIG. 8 is a flowchart showing the operation of the routing guide mediation server 40 (routing guide mediation system). In step S401, when a processing request is received from a route search server, e.g., the route search server 30A, the control means 401 determines whether a destination information request is included in the processing request in step S402, as shown in FIG. 8.

In the case that a destination information request is included, the process proceeds to step S403, and the control means 401 determines whether an area name is included in the destination information request. In the case that an area name is not included in the destination information request, the process proceeds to step S404, and a request is made to the route search server, e.g., the route search server 30B1 to which the routing guide mediation server 40 is connected via a network, for POI category information for POI that can be specified as a destination of a route search. When the POI category information is acquired in step S405, the POI category information is transmitted to the route search server 30A in step S406 and processing comes to an end.

In the case that an area name is included in the destination information request, the process proceeds to step S407, and the area determination means 45 determines the route search server, e.g., the route search server 30B1 of the route search system that provides the routing guide service to the area corresponding to the area name. In the case that there is no route search system that provides the routing guide service to the area that corresponds to the area name, the process proceeds to step S411, guidance-unavailable information is transmitted to the route search server 30A, and processing comes to an end.

In step S408, the POI information-providing means 46 requests POI information from the routing search server, e.g., the routing search server B1 determined in step S407. The process proceeds to step S409, and when POT information is acquired, the POI information-providing means 46 transmits the POI information to the route search server 30A in step S410, and processing comes to an end.

In the case that geographical point information (position information) of the destination G is not included in the processing request in step S402, the process proceeds to step S412, and the routing guide system determination means 43 determines the area that corresponds to the destination G, e.g., the destination G1. The process proceeds to step S413 and determines the route search server (route search server 30B1) that provides the routing guide system.

In step S413, in the case that it is determined that there is no route search system that provides routing guide service, guidance-unavailable information is transmitted to the route search server 30A in step S411 and processing comes to an end.

In step S413, in the case that it is determined that there is a route search server that provides route search service, the candidate route is edited on the basis of the connection information of the candidate contact points (PB1-1 to PB1-N) connected to the area to which the destination G, e.g., the destination G1, belongs; on the basis of the candidate contact points (PA1 to PAX) included in the processing request from the route search server 30A; and on the basis of the required time of the candidate routes (the candidate route from the step S searched in the route search server 30A to the candidate contact points PA1 to PAX).

Next, the process proceeds to step S415, and the required time of the candidate route edited in step S414, the destination G1, the candidate contact points (PB1-1 to BP1-N), and the connection information of the candidate contact points are transmitted to the route search server 30B1 of the area to which the destination G1 belongs. In step S416, in the case that recommended route data has not been received from the route search server 30B1 of the area to which the destination G1 belongs, the process proceeds to step S411, guidance-unavailable information is transmitted to the route search server 30A, and processing comes to an end.

In the step S416, in the case that recommended route data has been received from the route search server 30B1 of the area to which the destination G1 belongs, the process proceeds to step S417, the candidate contact points determined from the recommended route data received in step S416 and the recommended link data are transmitted to the route search server 30A, and processing comes to an end.

In the case that the system name of the request origination is included in the information transmitted to step S415, it is also possible to transmit the candidate contact points and recommended link data determined by the recommended route data to the request-originating system, e.g., the route search server 30A, without going through the routing guide mediation server 40 from the route search server on the area side to which the destination G belongs.

Next, a common method for searching for a route that includes movement routes by modes of transportation will be described. In the route search servers 30A, 30B1 to 30BM, the road network data 351 for searching for a movement route by walking or automobile and transportation network data 352 for searching for a movement route that uses public modes of transportation are stored in the route search network database 35 (see FIG. 3). The route search means 39 references the route search network database 35 and searches for a route by walking or automobile, or that uses both walking and modes of transportation.

The road network data 351 is configured in the following manner. For example, in the case that a road is composed of roads A, B, and C, as shown in FIG. 9, the roads connecting between nodes are expressed by directional links, and are composed of node data (node latitude and longitude), link data (link number), and link cost data in which the link cost each link is used as data (link distance, or required time to travel a link).

Figure 9:
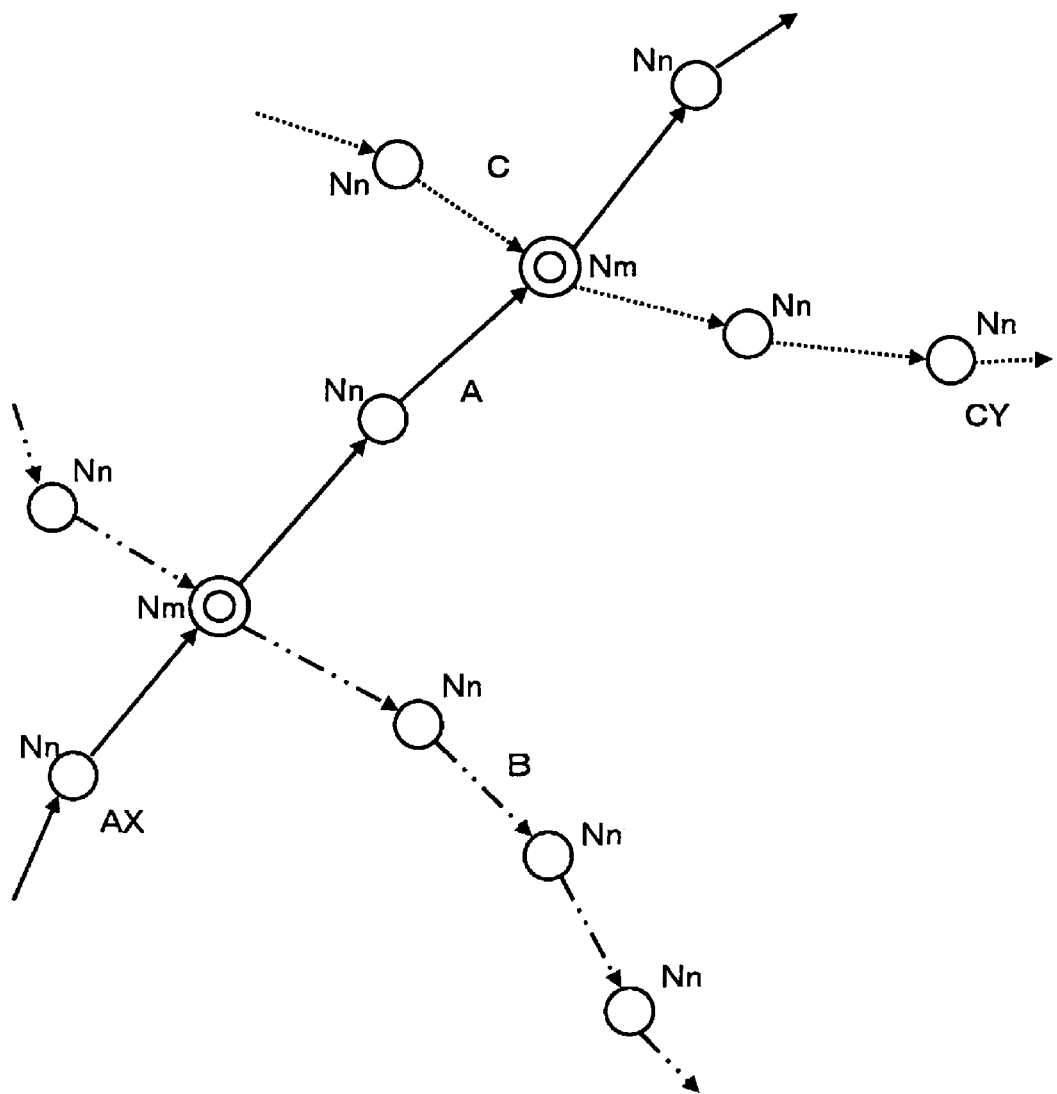
FIG. 9 is a schematic view showing the data concept of a road network.

In other words, in FIG. 9, Nn (○) and Nm (⊙) indicate nodes, and Nm (⊙) indicates a road intersection. The links having directionality connected between the nodes are indicated by arrows (solid, dotted, and chain-dotted). The links include links that face in the upward and downward directions of the road, but in FIG. 9, only links oriented in the direction of the arrows are shown in order to simplify the diagram.

In the case that a route search is carried out using such road network data as the route search database, the links connecting from the node of the departure point to the node of the destination are followed, the link costs are totaled, and the route having the lowest total link cost is searched and guidance is provided. In other words, in FIG. 9, in the case that a route search is carried out using the node AX as the departure point and the node CY as the destination, the links are sequentially followed by traveling road A from node AX, and making a right turn at the second intersection to enter road C and arrive at the node CY. The link costs are totaled and the route having the lowest total value of the link costs is searched and guidance is provided.

In FIG. 9, other routes that lead from node AX to node CY are not shown, but other such routes exist in actuality. Therefore, a plurality of routes that can lead from the node AX to the node CY are searched in the same manner, and the route having the lowest link costs among the routes is determined to the be the optimal route. This technique is carried out by, e.g., a well-known method referred to as the Dijkstra method.

Figure 10:
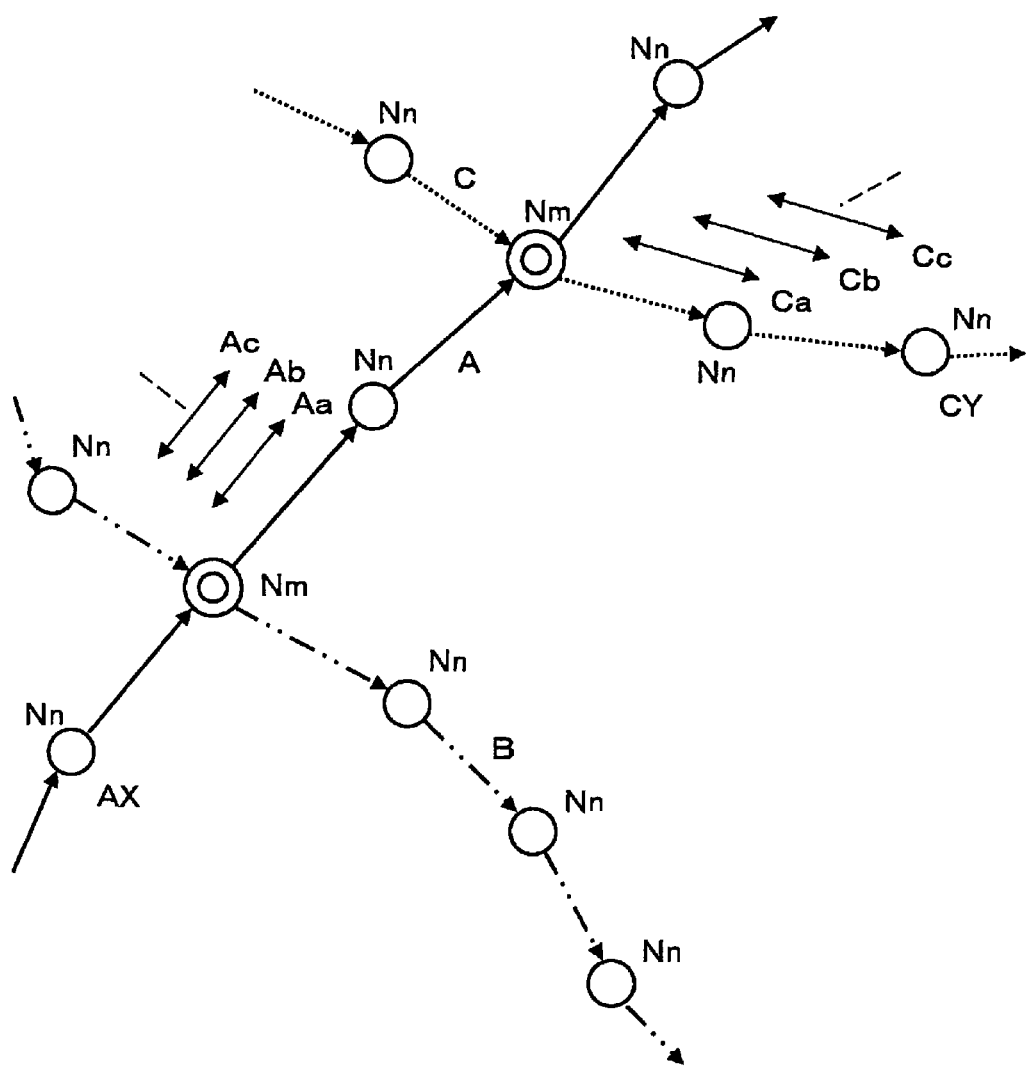
FIG. 10 is a schematic view showing the data concept of a transportation network.

In contrast, the transportation network data 352 for route searches using modes of transportation is configured in the manner described below. For example, in the case that the route is composed of transportation lines A, B, and C, as shown in FIG. 10, the stations (airports on aircraft routes) set on transportation lines A, B, and C are used as nodes, the intervals connecting between nodes are expressed by directional links, and are composed of node data (node latitude and longitude) and link data (link number) as network data. In FIG. 10, Nn (○) and Nm (◎) indicate nodes, and Nm (◎) indicates a transit change (transfer) on the transportation line. The links having directionality connected between the nodes are indicated by arrows (solid, dotted, and chain-dotted). The links include links that face in the upward and downward directions of the transportation line, but in FIG. 10, only links oriented in the direction of the arrows are shown in order to simplify the diagram.

However, the transportation network has link costs that are essentially different from those of a road network. In other words, in a road network, the link costs are fixed and static, but in a transportation network, there is a plurality of trains and aircraft (hereinbelow, the routes of individual trains, aircraft, and the like are referred to as transportation means) that operate along transportation lines, as shown in FIG. 10. The departure time from a node for each transportation means and the arrival time at the next node are established (specified by timetable data and operation data), and individual routes do not necessarily always link to an adjacent node. Examples of such cases include express trains and local trains. In such cases, a plurality of differing links is present on the same transportation line, and there are also cases in which the required time between nodes will differ depending on the transportation means.

In the transportation network illustrated in FIG. 10, a plurality of transportation means (routes) Aa to Ac . . . is present on the same link of the transportation line A, and a plurality of transportation means (routes) Ca to Cc . . . is present on the transportation line C. Therefore, the operation network of the modes of transportation is different from a simple road network, and the amount of data of the nodes, links, and link costs is an amount that is proportional to the total number of transportation means (routes of individual aircraft, trains, and the like). Accordingly, the data of the transportation network is a much greater amount than the amount of data of a road network.

In order to search for a route from a certain departure point to a certain destination using such a transportation network data, all of the transportation means that can be used (embarked upon) to arrive at the destination from the departure point are searched, and the transportation means that match the search conditions must be identified.

For example, in FIG. 10, in the case that a route search is carried out in which a specific departure time is specified using the node AX of the transportation line A as the departure point, and the node CY of the transportation line C is used as the destination, and all of the transportation means after the departure time among the transportation means Aa to Ac . . . that operate on the transportation line A are selected as routes for sequential departure times. All combinations of transportation means after a boardable time at the transit change node are searched on the basis of the arrival time at the transit change node to the transportation line C from among the transportation means Ca to Cc that operation on the transportation line C, and the time required for each route, the number of transfers, and the like are totaled and guidance is provided.

The route search server 30 searches for a plurality of candidate routes from a departure point to a destination in accordance with route search conditions using such network data, and transmits the results as route search data to the terminal device 20. In the case that the departure time from a departure point is specified in the route search conditions, the arrival time at a destination is included in the guidance route data, or in the case that the arrival time at a destination is specified, the departure time from a departure point in order to arrive at a destination at a specified time is included in the guidance route data. The terminal device 20 can display the data together with details of the request on the display means 25. In the case that a transfer station is included in the guidance route, the train that should transferred to at the transfer station and the departure time of the train can be display simultaneously.

In accordance with the present invention as described above, geographical point information of a plurality of candidate contact points in movement means that links countries and regions is exchanged via a routing guide mediation server (routing guide mediation system) when a route that straddles countries or regions is searched and guidance provided using roads and modes of transportation. The respective routing guide systems search for departure points or destinations and candidate routes to each candidate contact point, exchange information, integrate candidate contact points, use the integrated route as the recommended route having the lowest cost from the departure point to the destination, and provide the recommended route to the terminal device. It is therefore possible to readily coordinate a plurality of routing guide systems and to provide seamless route guidance from a departure point of a service area to a destination outside the service area.

The invention claimed is:

1. A routing guide mediation system provided with a routing guide mediation server connected to a plurality of routing guide systems, comprising:
    a route search server, for which a predetermined area is used as a service area, the route search server having a map database populated with map data of the area, and route search network data including road network data and transportation network data of the area; and
    a terminal device connected to said route search server, wherein
    said routing guide mediation server has:
    area determination means for determining, from geographical point information of a destination contained in a route search request transmitted from a first route search server, areas belonging to the geographical point;

routing guide system determination means for specifying a route search system that provides route guidance service to determined areas;

a contact point network database for storing connection information of a plurality of candidate contact points in movement means for linking said areas; and candidate contact point and candidate route data editing means for calculating candidate route information from a first area to a candidate contact point of a second area on the basis of route information in the areas searched by said first route search server;

said area determination means determines a second area to which the destination belongs from the destination information transmitted from the first route search server;

said routing guide system determination means determines a second route search server for providing routing guide service to the second area determined by the area determination means;

said candidate contact point and candidate route data editing means calculates routing information and contact point information transmitted from said first route search server, and routing information up to a candidate contact point of the second area on the basis of the connection information of the candidate contact point of said second area; and said routing guide mediation server transmits to said second route search server a route search request that includes said destination information and routing information calculated by said candidate contact point and candidate route data editing means, and transmits to said first route search server the link data of the candidate route which includes the data of a recommended route from the candidate contact point of said second area to the destination, as provided by said second route search server.

2. The routing guide mediation system according to claim 1, wherein, in a case that said routing guide mediation server is provided with POI information-providing means and the destination information related to the destination transmitted from the first route search server includes an area name and a destination information request, said POI information-providing means acquires the POI information from the second route search server determined by said routing guide system determination means on the basis of the area determined by said area determination means, and transmits the acquired POI information to said first route search server.

3. The routing guide mediation system according to claim 1, wherein, in a case that the destination information transmitted from the first route search server is only a destination information request, said POI information-providing means acquires POI category information from each of another plurality of route search servers connected via a network, and transmits the POI category information thus acquired to the first route search server.

4. A routing guide mediation server connected to a plurality of routing guide systems, comprising:

a route search server, for which a predetermined area is used as a service area, the route search server having a map database populated with map data of the area, and route search network data including road network data and transportation network data of the area; and a terminal device connected to said route search server, said routing guide mediation server includes:

area determination means for determining, from geographical point information of a destination contained in a route search request transmitted from a first route search server, areas belonging to the geographical point;

routing guide system determination means for specifying a route search system that provides route guidance service to determined areas;

a contact point network database for storing connection information of a plurality of candidate contact points in movement means for linking said areas; and candidate contact point and candidate route data editing means for calculating candidate route information from a first area to a candidate contact point of a second area on the basis of route information in the areas searched by said first route search server, wherein said area determination means determines a second area to which the destination belongs from the destination information transmitted from the first route search server;

said routing guide system determination means determines a second route search server for providing routing guide service to the second area determined by the area determination means;

said candidate contact point and candidate route data editing means calculates routing information and contact point information transmitted from said first route search server, and routing information up to a candidate contact point of the second area on the basis of the connection information of the candidate contact point of said second area; and said routing guide mediation server transmits to said second route search server a route search request that includes said destination information and routing information calculated by said candidate contact point and candidate route data editing means, and transmits to said first route search server the link data of the candidate route which includes the data of a recommended route from the candidate contact point of said second area to the destination, as provided by said second route search server.

5. The routing guide mediation server according to claim 4, wherein, in a case that said routing guide mediation server is provided with POI information-providing means and the destination information related to the destination transmitted from the first route search server includes an area name and a destination information request, said POI information-providing means acquires the POI information from the second route search server determined by said routing guide system determination means on the basis of the area determined by said area determination means, and transmits the acquired POI information to said first route search server.

6. The routing guide mediation server according to claim 4, wherein, in a case that the destination information transmitted from the first route search server is only a destination information request, said POI information-providing means acquires POI category information from each of another plurality of route search servers connected via a network, and transmits the POI category information thus acquired to the first route search server.

7. A routing guide method for using a routing guide mediation server connected to a plurality of routing guide systems, comprising:

a route search server, for which a predetermined area is used as a service area, the route search server having a map database populated with map data of the area, and route search network data including road network data and transportation network data of the area; and a terminal device connected to said route search server, said routing guide method characterized in comprising:

said routing guide mediation server including, area determination means for determining, from geographical point information of a destination contained in a route search request transmitted from a first route search server, areas belonging to the geographical point;

routing guide system determination means for specifying a route search system that provides route guidance service to determined areas;

a contact point network database for storing connection information of a plurality of candidate contact points in movement means for linking said areas; and candidate contact point and candidate route data editing means for calculating candidate route information from a first area to a candidate contact point of a second area on the basis of route information in the areas searched by said first route search server;

and further comprising:

a step in which said area determination means determines a second area to which the destination belongs from the destination information transmitted from the first route search server;

a step in which said routing guide system determination means determines a second route search server for providing routing guide service to the second area determined by the area determination means;

a step in which said candidate contact point and candidate route data editing means calculates routing information and contact point information transmitted from said first route search server, and routing information up to a candidate contact point of the second area on the basis of the connection information of the candidate contact point of said second area;

a step in which said routing guide mediation server transmits to said second route search server a route search request that includes said destination information and routing information calculated by said candidate contact point and candidate route data editing means; and a step in which said routing guide mediation server transmits to said first route search server the link data of the candidate route which includes the data of a recommended route from the candidate contact point of said second area to the destination, as provided by said second route search server.

8. The routing guide method according to claim 7, further comprising, in a case that said routing guide mediation server is provided with POI information-providing means and the destination information related to the destination transmitted from the first route search server includes an area name and a destination information request, a step in which said POI information-providing means acquires the POI information from the second route search server determined by said routing guide system determination means on the basis of the area determined by said area determination means, and transmits the acquired POI information to said first route search server.

9. The routing guide method according to claim 7, further comprising, in a case that the destination information transmitted from the first route search server is only a destination information request, a step in which said POI information-providing means acquires POI category information from each of another plurality of route search servers connected via a network, and transmits the POI category information thus acquired to the first route search server.

* * * * *